US012397644B2

United States Patent
Ishikawa

(10) Patent No.: US 12,397,644 B2
(45) Date of Patent: Aug. 26, 2025

(54) DISPLAY CONTROL DEVICE, DISPLAY DEVICE, AND DISPLAY CONTROL METHOD

(71) Applicant: Nippon Seiki Co., Ltd., Niigata (JP)

(72) Inventor: Teruko Ishikawa, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 0 days.

(21) Appl. No.: 18/713,787

(22) PCT Filed: Nov. 28, 2022

(86) PCT No.: PCT/JP2022/043695
§ 371 (c)(1),
(2) Date: May 28, 2024

(87) PCT Pub. No.: WO2023/095899
PCT Pub. Date: Jun. 1, 2023

(65) Prior Publication Data
US 2025/0042254 A1  Feb. 6, 2025

(30) Foreign Application Priority Data
Nov. 29, 2021  (JP) .................. 2021-193452

(51) Int. Cl.
*B60K 35/81*  (2024.01)
*B60K 35/22*  (2024.01)
(Continued)

(52) U.S. Cl.
CPC .............. *B60K 35/81* (2024.01); *B60K 35/22* (2024.01); *B60K 35/265* (2024.01); *B60K 35/60* (2024.01);
(Continued)

(58) Field of Classification Search
CPC ................................ B60K 35/22; B60K 35/00
See application file for complete search history.

(56) References Cited

U.S. PATENT DOCUMENTS

2008/0143505 A1 * 6/2008 Maruyama ............. B60K 35/10
701/532
2017/0106786 A1   4/2017 Ebina
(Continued)

FOREIGN PATENT DOCUMENTS

JP          6244460 B2   12/2017
JP       2018-203012 A   12/2018
(Continued)

OTHER PUBLICATIONS

International Search Report dated Dec. 27, 2022 issued in International Patent Application No. PCT/JP2022/043695, with English translation.

*Primary Examiner* — Nan-Ying Yang
(74) *Attorney, Agent, or Firm* — Rimon P.C.

(57) ABSTRACT

A control unit of a display control device, which controls an illumination unit capable of forming a display with light on a steering wheel in a vehicle comprising a driving assistance function, controls rendering by first display elements formed on a central portion of a steering wheel, a second display element formed on connecting portions and a third display element formed on an outer edge, when there is a change in a driving assistance level. The control unit causes a driver to have a first sense in which the driving responsibility of a vehicle is transitioning from the front part of the vehicle in front of the steering wheel to the steering wheel, and a second sense in which the driving responsibility of the vehicle is transitioning from the steering wheel to the front part of the vehicle, thereby presenting change information regarding the driving assistance level.

20 Claims, 20 Drawing Sheets

(51) Int. Cl.
*B60K 35/26* (2024.01)
*B60K 35/60* (2024.01)
*B60K 35/65* (2024.01)
*G09G 3/00* (2006.01)

(52) U.S. Cl.
CPC ........... *B60K 35/654* (2024.01); *G09G 3/003* (2013.01); *G09G 3/004* (2013.01); *B60K 2360/16* (2024.01); *B60K 2360/161* (2024.01); *B60K 2360/186* (2024.01); *B60K 2360/31* (2024.01); *B60K 2360/349* (2024.01); *B60K 2360/782* (2024.01); *G09G 2320/0666* (2013.01); *G09G 2320/0686* (2013.01); *G09G 2340/045* (2013.01); *G09G 2380/10* (2013.01)

(56) References Cited

U.S. PATENT DOCUMENTS

| | | | | |
|---|---|---|---|---|
| 2017/0267285 | A1* | 9/2017 | Abbas | B60R 21/16 |
| 2018/0286242 | A1* | 10/2018 | Talamonti | B60K 35/60 |
| 2019/0004514 | A1 | 1/2019 | Hiwatashi et al. | |
| 2019/0176881 | A1* | 6/2019 | Hwang | B62D 6/002 |
| 2020/0089226 | A1 | 3/2020 | Breisinger et al. | |
| 2022/0297751 | A1* | 9/2022 | Nakahara | B62D 15/029 |

FOREIGN PATENT DOCUMENTS

| | | |
|---|---|---|
| JP | 2019-010929 A | 1/2019 |
| JP | 2019-142271 A | 8/2019 |
| JP | 2021-046033 A | 3/2021 |
| WO | 2015/145605 A1 | 10/2015 |

\* cited by examiner

FIG.2
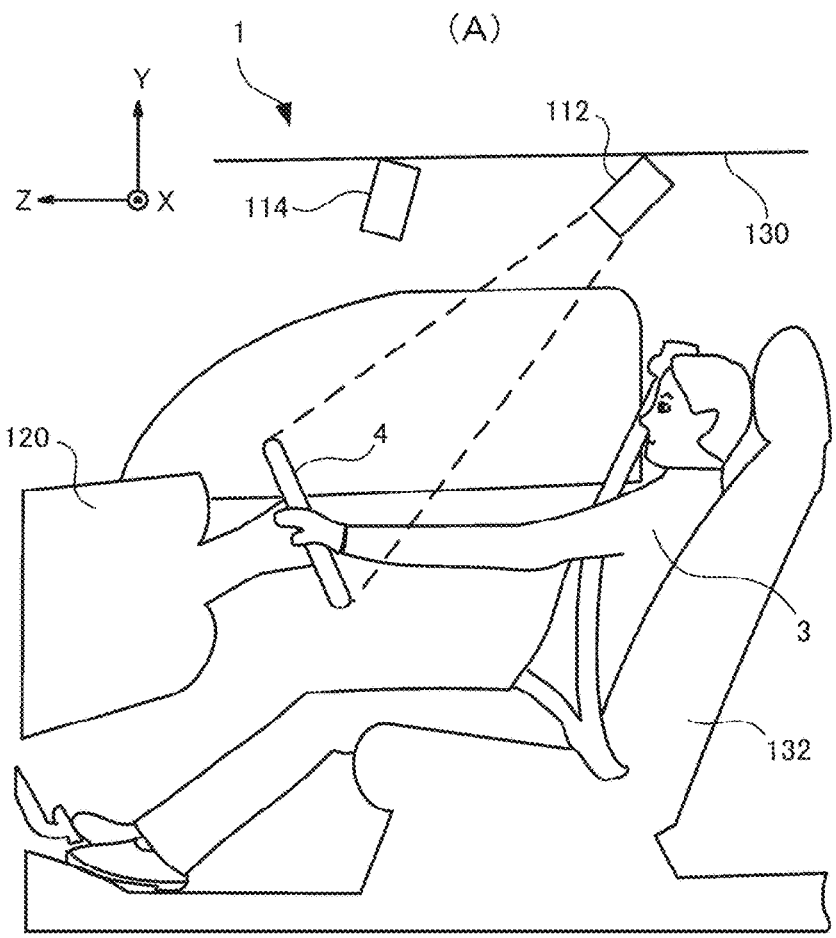
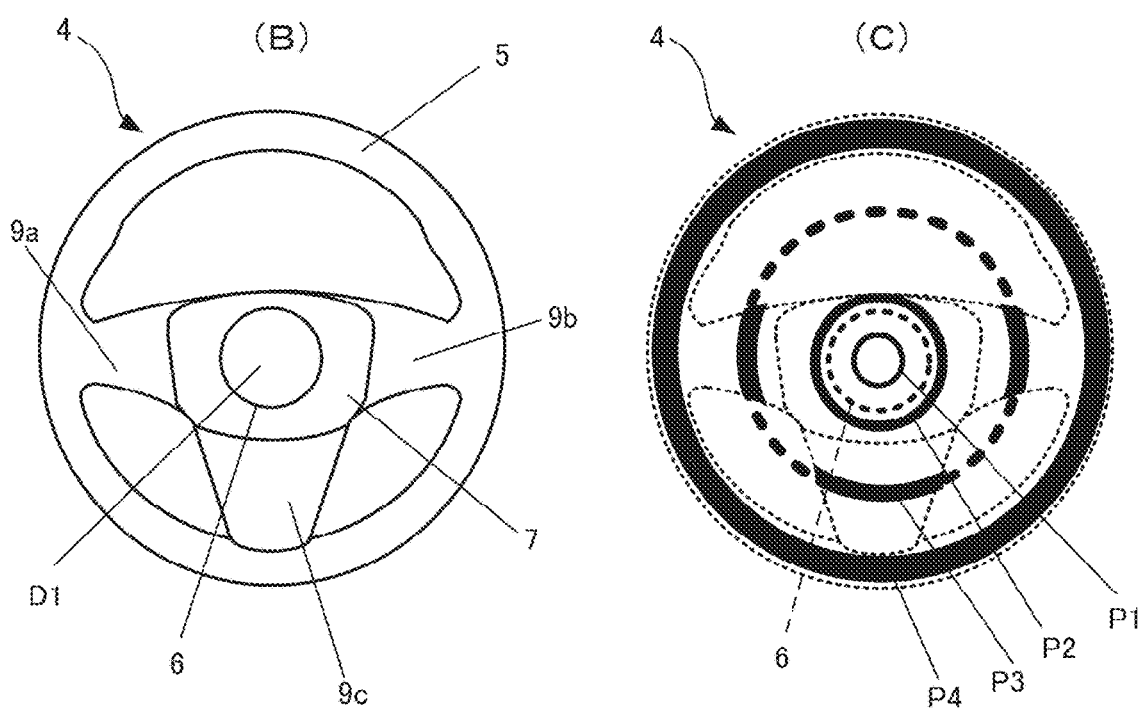

FIG.4
(A)
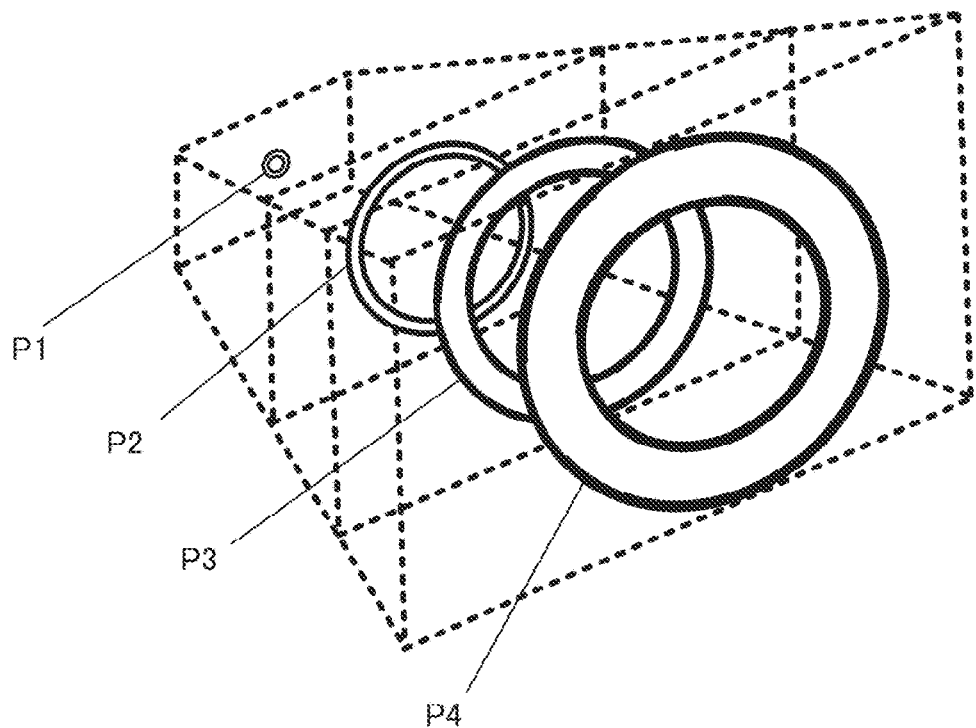
(B)
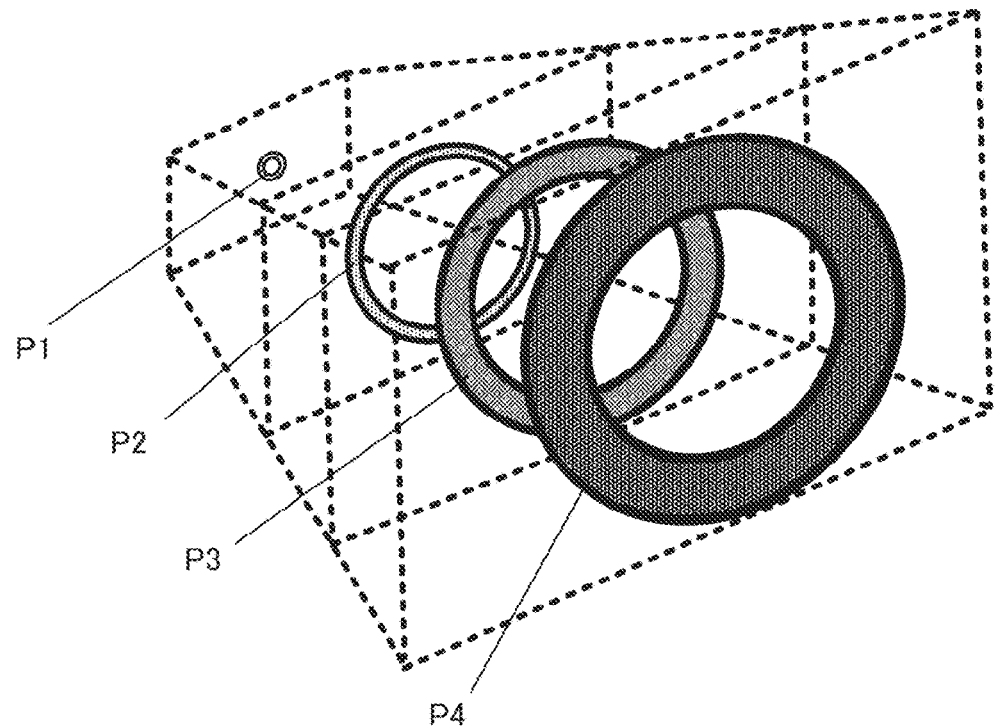

AUTONOMOUS DRIVING HAS STARTED
PLEASE RELEASE YOUR HAND
FROM STEERING WHEEL

FIG.17
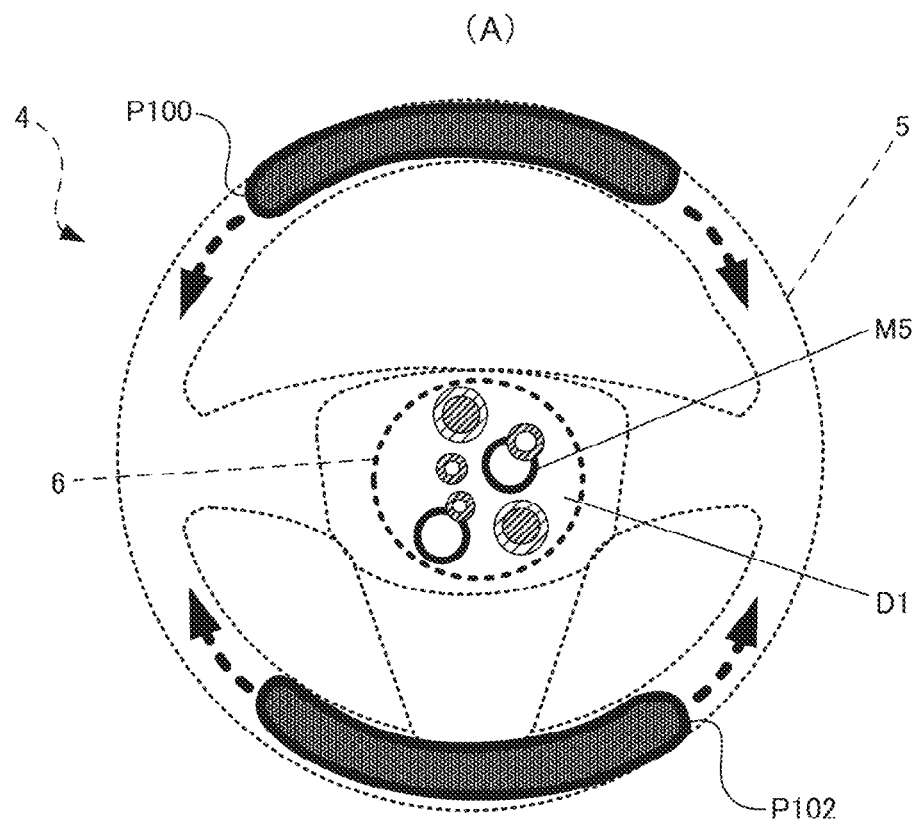
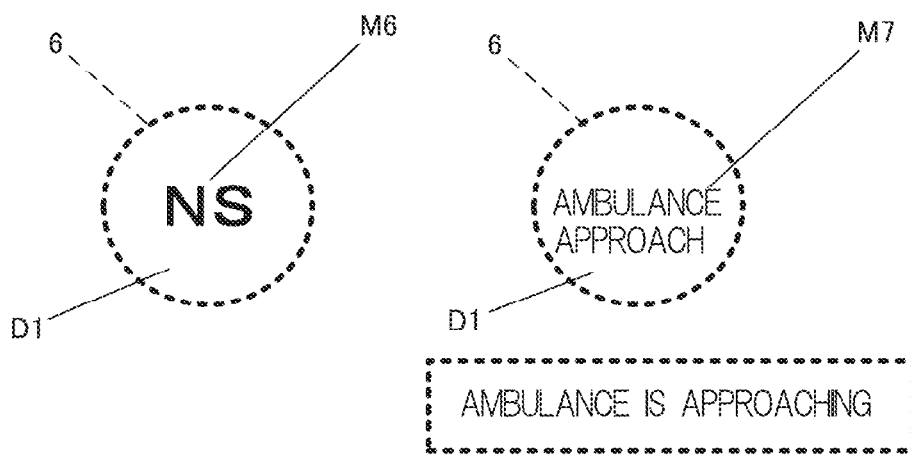

FIG.19

| LEVEL | NAME | DRIVING SUBJECT | TRAVELING REGION |
|---|---|---|---|
| 0 | NO DRIVING AUTOMATION (MANUAL DRIVING: VEHICLE NOT EQUIPPED WITH ADAS) | PERSON | NOT APPLIED |
| 1 | DRIVING ASSISTANCE | PERSON | LIMITED |
| 2 | PARTIAL DRIVING AUTOMATION (HANDS-OFF) | PERSON | LIMITED |
| 3 | CONDITIONAL DRIVING AUTOMATION (EYES-OFF) | SYSTEM | LIMITED |
| 4 | ADVANCED DRIVING AUTOMATION (BRAIN-OFF) | SYSTEM | LIMITED |
| 5 | COMPLETE DRIVING AUTOMATION | SYSTEM | NO LIMIT |

DISPLAY CONTROL DEVICE, DISPLAY DEVICE, AND DISPLAY CONTROL METHOD

CROSS-REFERENCE OF RELATED APPLICATIONS

This application is the U.S. National Phase under 35 U.S.C. § 371 of International Patent Application No. PCT/JP2022/043695, filed on Nov. 28, 2022, which in turn claims the benefit of Japanese Patent Application No. 2021-193452, filed on Nov. 29, 2021, the entire disclosures of which Applications are incorporated by reference herein.

TECHNICAL FIELD

The present invention relates to, for example, a display control device provided in a vehicle such as an automobile, a display device, and a display control method.

BACKGROUND ART

For example, Patent Documents 1 and 2 below disclose a technique that is mounted on an automobile having an autonomous driving function, operates in conjunction with an autonomous driving system or the like, and displays (presents) change information on a driving assistance level to a driver.

Patent Document 1 discloses that a projector (illumination unit) is provided in a vehicle to locally illuminate a circular rim, which is an outer peripheral portion of a steering wheel, and an illumination position is moved closer to a hand of a driver gripping the rim when a driving mode of the vehicle is switched from an autonomous driving mode to a manual driving mode, and the illumination position is moved away from the hand of the driver when the driving mode is switched from the autonomous driving mode to the manual driving mode (for example, [0047], [0050], FIGS. 1, 3, and 4).

In Patent Document 2, a first illumination unit including a bar light (band-like light) such as an LED is provided in an upper half of a circular rim, which is an outer peripheral portion of a steering wheel, and a second illumination unit configured to be elongated is provided at a position under a windshield of a dashboard positioned in front of the steering wheel. The first and second illumination units are actually separated from each other in the front-rear direction, but when viewed from the driver, the first and second illumination units are connected to each other and perceived as if they were one common illumination unit. At the time of shift from autonomous driving to manual driving, the moving light that moves from the first illumination unit toward the second illumination unit is generated, and at the time of shift from manual driving to autonomous driving, the moving light that moves from the second illumination unit toward the first illumination unit is generated (for example, [0035], [0038], [0042], FIG. 2).

PRIOR ART DOCUMENT

Patent Document

Patent Document 1: Japanese Unexamined Patent Publication No. 2019-142271
Patent Document 2: Japanese Patent No. 6244460

SUMMARY OF THE INVENTION

Problems to be Solved by the Invention

In Patent Document 1, for example, a substantially triangular light symbol is displayed on a rim of a steering wheel, and the light symbol is moved; however, the size of the light symbol is considerably small as compared with the entire steering wheel.

In addition, the path along which the light symbol is moved toward and away from the driver's hand is limited to the upper half range of the rim.

Therefore, it may be difficult for the driver to recognize a slight movement of the small light symbol while paying attention to the front, for example, and to recognize how the driving mode is shifted from the direction of the movement. Therefore, there is room for improvement.

Further, in Patent Document 2, since the elongated optical path is formed using the first and second illumination units, the path of the moving light may be made long.

However, the first illumination unit is provided on the rim of the steering wheel and the second illumination unit is provided on the dashboard located in front of the steering wheel, and the units are spatially separated.

Therefore, when the light is moved from the first unit to the second unit or from the second unit to the first unit, the driver may feel discomfort when the units are switched. In addition, since the movement path of the light is considerably long, it takes time to move the light.

This is disadvantageous in terms of quickly informing the driver of a change in the driving level. Therefore, there is room for improvement.

An object of the present invention is to, for example, when a driving mode is changed, realize a display that allows a driver to intuitively recognize change content without a sense of discomfort.

Other objects of the present invention will become apparent to those skilled in the art by referring to the aspects and best embodiment exemplified below and the accompanying drawings.

Solution to Problem

Hereinafter, in order to easily understand the outline of the present invention, an embodiment according to the present invention will be exemplified.

According to a first aspect, a display control device controls an illumination unit capable of forming a display with light on a steering wheel including a central portion, an outer edge, and a connecting portion that connects the central portion and the outer edge in a vehicle having a driving assistance function, and the display control device includes a control unit that controls rendering by a first display element formed in the central portion of the steering wheel, a second display element formed in the connecting portion, and a third display element formed in the outer edge, wherein when a driving assistance level is changed, by rendering by the first display element, the second display element, and the third display element on the steering wheel, the control unit presents change information on the driving assistance level by causing a driver of the vehicle to have at least one of a first sense in which a driving responsibility of the vehicle moves toward the steering wheel from a front portion in front of the steering wheel of the vehicle, and a second sense in which the driving responsibility of the vehicle moves from the steering wheel toward the front portion of the vehicle.

According to the first aspect, the steering wheel includes the central portion, the outer edge, and the connecting portions that connect the central portion and the outer edge and, by using a two-dimensional spread when viewed from the driver, each of the above-described portions is used as the display region of the display element (pattern, mark, etc.).

The outer shape of the steering wheel is typically a symmetrical (bilaterally symmetrical) shape that is symmetrical with respect to the right and left. By using this, for example, it is possible to realize rendering of the display that gives the driver a sense such that ripples are spreading, or rendering of the display that gives the driver a sense such that the spread ripples are conversely shrinking toward the center of the circle.

As an example, assuming three concentric circles of a small-sized circle (small circle), a medium-sized circle (medium circle), and a large-sized circle (large circle) sharing the center, when the small circle is displayed in the central portion, a part of the medium circle is displayed in the connecting portion, and the large circle is displayed in the outer edge having an annular shape, for example, it is also possible to form a symmetrical pattern (a pattern which gives a sense of a two-dimensional spread) in a ripple shape which spreads from the center to the outside.

Here, for example, it is possible to cause the driver to perceive an image having a sense of depth (stereoscopic effect) by the above-described rendering of each pattern (for example, an expression method devised to generate a predetermined effect), and it is also possible to give a motion to the image by the above-described rendering effect.

In addition, the steering wheel may be regarded as a structure that spatially divides (partitions) the front portion (leading end portion) of the vehicle and the driver.

Therefore, for example, by causing the driver to perceive an image having a stereoscopic effect and giving a perception of traveling (moving) from a portion (front portion) of the vehicle in front of the steering wheel to the steering wheel, it is possible to cause the driver to have a sense (first sense) as if the driving responsibility (the subject responsible for driving) moved (shifted) from the vehicle to the driver himself/herself. In addition, depending on the rendering of the display (in particular, the rendering for causing the driver to perceive a motion), it is also possible to give a sense (second sense) as if the driving responsibility moved (shifted) from the steering wheel to the front portion of the vehicle.

Therefore, at the time of changing the driving assistance level (which may be rephrased as the autonomous driving level, the driving mode, or the like), rendering by the display elements described above is performed so that the driver may intuitively recognize the change content without a sense of discomfort. The driver does not follow the movement of the display element with the eyes and confirm and understand the moving direction as in the related art, but intuitively understands the change content, and therefore instantaneous understanding is realized. Therefore, it is possible to shorten the time required for the driver to understand that the driving mode has been changed. This also contributes to safe driving and the like.

Among the central portion, the connecting portions, and the outer edge of the steering wheel, for example, the connecting portions may not be used as regions where the display elements are formed. However, in this case, it is considered that expressive rendering of not forming the display elements in the connecting portions is performed. Therefore, such an example is also included in the technical scope of the present invention.

In a second aspect according to the first aspect, when the steering wheel viewed from the driver is one virtual plane having a two-dimensional spread in a real space, a virtual first responsible area may be set on a side of the front portion of the vehicle and a virtual second responsible area may be set on a side of the driver with the plane as a boundary, and the control unit may cause the driver to have the first sense and thus recognize a shift from the first responsible area to the second responsible area, and may cause the driver to have the second sense and thus recognize a shift from the second responsible area to the first responsible area.

According to the second aspect, the steering wheel viewed from the driver is set as one virtual plane having a two-dimensional spread in the real space, and a virtual first responsible area and a virtual second responsible area are set before and after the plane.

For example, when the concept of the above first and second responsible areas is described in an explanation manual of the vehicle display device, the driver who reads the explanation manual learns and memorizes the concept of the responsible areas.

Therefore, when the above-described first and second senses are generated during the driving of the vehicle, the concept of the responsible area by the learning is instantaneously recalled, and it is possible to instantaneously recognize (understand) that the movement has been made to the responsible area. Therefore, the driver may understand the change content of the driving assistance level quickly, clearly, and reliably.

In a third aspect according to the first or second aspect, the control unit may cause the driver to have the first sense when driving assistance is reduced, and may cause the driver to have the second sense when driving assistance is expanded.

According to the third aspect, it is possible to accurately inform the driver whether the driving assistance has been reduced or expanded.

The reduction of the driving assistance is, in other words, a decrease in the autonomous driving level, and the expansion of the driving assistance is, in other words, an increase in the autonomous driving level.

In particular, when the driving subject of the vehicle shifts (moves) from the vehicle to the driver or from the driver to the vehicle due to a change in the autonomous driving level, the driver needs to understand the change content quickly and reliably.

According to the present invention, even when the driving subject has been changed, it is possible to instantly and accurately inform the driver which is responsible for the traveling of the vehicle. Therefore, the driver may feel safe during the traveling of the vehicle.

In a fourth aspect according to any one of the first to third aspects, when performing rendering by the first display element, the second display element, and the third display element of the steering wheel, the control unit may express each of the first display element, the second display element, and the third display element in perspective so that one image perceived by the driver becomes a stereoscopic image having a sense of depth based on each of the first display element, the second display element, and the third display element, and may display the first display element, the second display element, and the third display element at different times or cause changes in display states of the first display element, the second display element, and the third display element at different times so that the driver feels a motion.

According to the fourth aspect, the visual effect as described in the first to third aspects is realized by the rendering using the perspective and the dynamic expression.

In a case where each of the first display element, the second display element, and the third display element is regarded as a component of one image, each display element (each component of one image) is expressed in perspective, whereby the driver may perceive the one image as a stereoscopic image having a sense of depth.

Further, by shifting the display timings of the first display element, the second display element, and the third display element on the time axis, it is possible to make the driver feel that there is a motion.

Further, although the first, second, and third displays themselves are simultaneously displayed on the time axis, the driver may also feel that there is a motion by causing a change in the display state that occurs in each display (for example, a change in the display state in which the luminance or brightness increases instantaneously) at different times.

Even when the display timings of the first display element, the second display element, and the third display element are shifted on the time axis, a small timing difference allows the driver to perceive (recognize) one image due to an afterimage effect (an effect in which, when a viewer sees light or an image, the light or the image that the viewer has seen remains even after the light or the image disappears).

In a fifth aspect according to any one of the first to third aspects, when performing rendering by the first display element, the second display element, and the third display element of the steering wheel, the control unit may express each of the first display element, the second display element, and the third display element in perspective so that one image perceived by the driver becomes a stereoscopic image having a sense of depth based on each of the first display element, the second display element, and the third display element, and when causing the driver to have the first sense, may display the first display element, the second display element, and the third display element in this order at different times to make the driver feel a motion from a far side to a near side when viewed from the driver, or may display the first display element, the second display element, and the third display element at the same time and change display states of the first display element, the second display element, and the third display element in this order at different times to make the driver feel a motion from the far side to the near side when viewed from the driver, when causing the driver to have the second sense, may display the third display element, the second display element, and the first display element in this order at different times to make the driver feel a motion from the near side to the far side when viewed from the driver, or may display the first display element, the second display element, and the third display element at the same time and change display states of the third display element, the second display element, and the first display element in this order at different times to make the driver feel a motion from the near side to the far side when viewed from the driver.

The fifth aspect describes the rendering of the display element described in the fourth aspect in more detail. According to the fifth aspect, too, the visual effect as described in the first to third aspects is realized by the rendering using the perspective and the dynamic expression.

By controlling the display order of the first display element, the second display element, and the third display element or the order in the case of changing the display state, it is possible to effectively generate the first sense and the second sense described above.

In a sixth aspect according to the fifth aspect, when expressing each of the first display element, the second display element, and the third display element in perspective, the control unit may increase sizes of the first display element, the second display element, and the third display element in this order to generate a sense of perspective by linear perspective, or may increase sizes of the first display element, the second display element, and the third display element in this order to generate a first sense of perspective by linear perspective and express each of the first display element, the second display element, and the third display element by aerial perspective to generate a second sense of perspective whose directionality matches directionality of the first sense of perspective.

According to the sixth aspect, the driver is caused to perceive a stereoscopic image having a sense of depth by linear perspective or a combination of linear perspective and aerial perspective.

Here, "perspective" is a method of visually expressing a sense of perspective. The "linear perspective" is an expression method of expressing, by line drawing, a perspective in which an object appears smaller as the distance increases from the near side toward the far side.

The "aerial perspective method" is originally "a perspective expression method using the fact that the light entering the eyes is actually affected by air (atmosphere), and therefore an object farther from the viewpoint is more bluish or has a more unclear contour line and looks hazy due to a large amount of air interposed between the viewpoint and the object" and typically is "a method of expressing a sense of perspective by drawing a distant object so as to look fainter and hazier and is an expression method also capable of applying perspective using a color, color tone, and the like (hue, contour, shade, etc.).

As an example of the use of the aerial perspective, for example, it may be assumed that the driver feels that the third display element is positioned close to the driver, the second display element is positioned further away, and the first display is positioned even further away by increasing the luminance or brightness and increasing the sharpness of the first display element, the second display element, and the third display element in this order. Thus, an image having a stereoscopic effect (sense of depth) may be displayed to the driver.

In a seventh aspect according to any one of the first to sixth aspects, each of the first display element and the third display element may have a circular or annular shape, and the second display element may be a linear or band-like display piece formed in a part of the connecting portion, or each of the first display element, the second display element, and the third display element may include a pair of separated linear or band-like display pieces, or each of the first display element, the second display element, and the third display element may include a pair of separated linear or band-like display pieces, and each of the display pieces may be arranged on a virtual concentric circle centered on one point set in the central portion of the steering wheel and on a virtual straight line passing through the one point and intersecting with each concentric circle.

In the seventh aspect, the shape (and arrangement) of each display light is exemplified.

For example, a pattern based on a concentric circle (concentric annular ring) may be displayed by each display element.

In addition, a pair of separated linear or band-like display pieces, such as arcs along the outer circumference of each concentric circle (concentric annular ring) may be displayed. When a linear or band-like display piece such as an arc is used, not only the change content of the driving assistance level but also other useful information may be transmitted to the driver in an easily understandable manner.

For example, when the driving assistance is reduced and the manual driving mode is set, the region of the outer edge of the steering wheel gripped by the driver may be indicated by the display piece, or the display position of the display piece may be changed to prompt the driver to, for example, step on the brake or check the front by the display piece.

Further, by changing the position of the display piece in accordance with the automatic rotation of the steering wheel after the mode is switched to the autonomous driving mode, the driver may easily know that the autonomous driving is being performed smoothly and may obtain a sense of security.

Further, when each of the display pieces is displayed, each of the pair of display pieces is displayed (arranged) on each concentric circle (concentric annular ring) and on the straight line passing through the center of the circle (annular ring) and intersecting with each circle (annular ring) (in other words, the straight line forming the diameter of the maximum circle), for example, while maintaining the balance between the right and left so that an image symmetrical with respect to the right and left may be displayed without a sense of discomfort.

In an eighth aspect according to the fifth aspect, when causing the driver to have the first sense, the control unit may perform an emphasis process to emphasize the third display element at a display timing of the third display element or after the third display element is displayed, or may perform an emphasis process to emphasize the third display element at a timing of a change in the display state of the third display element or after the display state of the third display element is changed.

In the eighth aspect, when the display elements are displayed at different times or the display states of the display elements are changed at different times to make the driver feel a motion from the far side to the near side (the first sense), the emphasis process is performed on the third display element at the timing when the third display element is displayed on the outer edge of the steering wheel or after the timing.

The "emphasis process" may be performed by, for example, temporarily increasing the luminance or brightness of the third display piece or temporarily blinking the third display piece. In other words, the "emphasis process" may be referred to as "the process of temporarily changing the display state to improve the noticeability". By making the driver look at the display, it is possible to prevent the driver from overlooking the change in the driving assistance level by impressing the driver that the driving assistance level has been changed and to make the driver reliably recognize the change content in the driving assistance level.

In addition, when the driving responsibility shifts from the vehicle to the driver, it is possible to obtain an advance preparation effect of clearly informing the driver that the driver has the driving responsibility and making the driver prepare to hold the steering wheel (making the driver have mental preparation in advance).

In a ninth aspect according to the eighth aspect, in the emphasis process, the control unit may temporarily increases luminance or brightness of the third display element or temporarily change color, hue, or saturation of the third display element, or when the third display elements are a pair of separated linear or band-like display pieces, may temporarily extend a length of the display pieces, or when the third display elements are a pair of separated linear or band-like display pieces, may swing the display pieces along the outer edge of the steering wheel.

In the ninth aspect, a specific example of the emphasis process is exemplified. In this way, it is possible to temporarily improve the noticeability by temporarily changing the color or the like of the third display element, temporarily changing the length, or controlling the position of the third display element such that the third display element is moved as if the third display element is swinging.

In a tenth aspect according to any one of the first to ninth aspects, the control unit, on the outer edge of the steering wheel, may display a linear or band-like display piece indicating a region to be gripped by the driver with each of a left hand and a right hand, or on the outer edge of the steering wheel, may display a linear or band-like display piece at a position corresponding to a subsequent action to be taken by the driver, or may move a linear or band-like display piece in a direction corresponding to the subsequent action to be taken by the driver either at the central portion or at the central portion and the connecting portion of the steering wheel, or may move a linear or band-like display piece in accordance with automatic rotation of the steering wheel by autonomous driving.

In the tenth aspect, a display example in a case where other useful information (information other than the driving level change information) is displayed in association with the notification of the change in the driving level will be described.

For example, in a case where the driving subject shifts from the vehicle to the driver, by displaying the linear or band-like display pieces at the right and left positions of the outer edge of the steering wheel in the middle of shifting or after shifting, it is possible to indicate the gripping position of the steering wheel to the driver.

Further, by changing the display position of the linear or band-like display piece in accordance with the subsequent action to be taken by the driver, it is possible to cause the driver to recognize in advance what to do and to have mental preparation. For example, when an operation of stepping on the brake is required, the linear or band-like display piece may be displayed on the lower side of the outer edge of the steering wheel.

In addition, by moving the display piece (in a broad sense, a predetermined light pattern or light mark) in a direction corresponding to the subsequent action to be taken by the driver at the center portion of the steering wheel or at the center portion and the connecting portion, the driver may recognize what to do in advance and have mental preparation. For example, in the case of prompting the driver to pay attention obliquely forward, the display piece (light pattern or light mark in a broad sense) may be moved obliquely upward at the central portion.

In an eleventh aspect according to any one of the first to tenth aspects, the control unit may display a light mark including at least one of a character, a figure, and a symbol indicating a driving state, a driving situation, or information regarding a subsequent operation to be performed by the driver on the central portion of the steering wheel, or may display a light mark including at least one of a character, a figure, and a symbol indicating a driving state, a driving situation, or information regarding a subsequent operation to be performed by the driver on the central portion of the steering wheel and notify the information by voice.

In the eleventh aspect, the light mark capable of presenting useful information to the driver is displayed in the central portion of the steering wheel. Thus, useful information may be displayed to the driver in an easy-to-see or easy-to-understand manner.

Further, it is also possible to convey the above-described useful information to the driver by voice in combination with voice guidance. Thus, information may be transmitted more accurately. In addition, since a driving situation or the like may be recognized visually and aurally, understanding of information is promoted.

In a twelfth aspect according to any one of the first to eleventh aspects, before causing the driver to have the second sense, the control unit may perform a display process to increase noticeability on the outer edge of the steering wheel.

According to the twelfth aspect, in a case where the driver is notified of the expansion of the driving assistance level, the display for increasing the noticeability is displayed on the steering wheel in advance so that, for example, it is possible to cause the driver to instantaneously understand that the display indicating that the driving level has been changed is started. Therefore, the user may have mental preparation in advance. Therefore, for example, it is possible to obtain an effect of reducing a sense of discomfort due to the sudden start of light rendering.

In a thirteenth aspect according to any one of the first to twelfth aspects, the control unit may display a first circle or annular ring in the central portion of the steering wheel, may display a part of a second circle or annular ring concentric with the first circle or annular ring in the connecting portion, and when displaying a third circle or annular ring concentric with the first circle or annular ring and the second circle or annular ring in the outer edge, may set a line width or a band width of the second circle or annular ring to be larger than a line width or a band width of the first circle or annular ring and the third circle or annular ring.

In the thirteenth aspect, at the connecting portion of the steering wheel, a sense of discomfort is likely to occur due to the fact that the entire circle or annular ring cannot be displayed, and therefore, display control for suppressing the sense of discomfort is performed.

For example, it is assumed that display control is performed such that the diameter of the third annular ring is gradually reduced and the third annular ring is moved to the second annular ring, and the diameter of the second annular ring is gradually reduced and the second annular ring is moved to the first annular ring (however, the reverse movement may be performed).

In this case, when it takes time to pass through the connecting portion, a period in which a sense of discomfort occurs becomes longer. Therefore, in order to shorten the passage time of the band of light in the connecting portion, the band width of the band of light is made larger (wider) than the band width in the annular ring of the central portion or the outer edge, and the band of light is quickly moved so as to pass the connecting portion in a short time. As a result, a sense of discomfort may be reduced.

In a fourteenth aspect, a display device includes: the display control device according to any one of the first to thirteenth aspects provided in the vehicle; and an illumination unit that is provided in the vehicle and whose light emission is controlled by the display control device.

According to the fourteenth aspect, it is possible to realize the vehicle display device (specifically, for example, in-car projector) capable of displaying, when the driving mode is changed, the change content so that the driver may intuitively recognize the change content without a sense of discomfort.

In a fifteenth aspect according to the fourteenth aspect, the illumination unit may include a projector that projects light onto the steering wheel of the vehicle to illuminate the steering wheel, or may include a projector that projects light onto the steering wheel of the vehicle to illuminate the steering wheel and a light emitting element provided on the steering wheel, or may include a light emitting element provided on the steering wheel.

In the fifteenth aspect, a configuration example of the illumination unit is described.

The illumination unit may be a projector that projects light for illumination, may be configured to include a projector and a light emitting element (at least one light emitting element) provided in the steering wheel, or may be configured to include only a light emitting element (a plurality of light emitting elements) provided in the steering wheel.

For example, an applied use example may be assumed in which only the projector is used at night, and the projector and the light emitting unit are used in combination or only the light emitting unit is used in an environment in which the intensity of external light is high in the daytime.

In a sixteenth aspect, a display control method is for forming a display with light on a steering wheel including a central portion, an outer edge, and a connecting portion that connects the central portion and the outer edge in a vehicle having a driving assistance function, and the display control method includes, when a driving assistance level is changed, by controlling rendering by a first display element formed in the central portion of the steering wheel, a second display element formed in the connecting portion, and a third display element formed in the outer edge, presenting change information on the driving assistance level by causing a driver of the vehicle to have at least one of a first sense in which a driving responsibility of the vehicle moves toward the steering wheel from a front portion in front of the steering wheel of the vehicle, and a second sense in which the driving responsibility of the vehicle moves from the steering wheel toward the front portion of the vehicle.

According to the sixteenth aspect, when the driving assistance level is changed, the driver may intuitively recognize the change content without a sense of discomfort by performing the rendering using the display element. The driver does not follow the movement of the display element with the eyes and confirm and understand the moving direction as in the related art, but intuitively understands the change content, and therefore instantaneous understanding is realized. Therefore, it is possible to shorten the time required for the driver to understand that the driving mode has been changed. This also contributes to safe driving and the like.

When a computer program is used, the above-described display control method may be simply and easily implemented by a computer system having a basic configuration including a processor, a memory, and the like.

Those skilled in the art will readily appreciate that the aspects in accordance with the present invention exemplified may be further modified without departing from the spirit of the present invention.

BRIEF DESCRIPTION OF THE DRAWINGS

FIG. 2(A) is a diagram illustrating an arrangement example of a projection device forming an illumination unit in a vehicle, FIG. 2(B) is a front view of a steering wheel, and FIG. 2(C) is a diagram illustrating annular patterns (first and third display elements) and a band-like pattern (second display element) projected on the steering wheel.

FIGS. 4(A) and (B) are diagrams illustrating an example in which the first display element to the third display element are expressed in perspective in order to cause the driver to perceive an image having a sense of depth (stereoscopic effect).

FIG. 17(A) is a diagram illustrating a display example (including a mark (light mark) displayed in the central portion of the steering wheel) in the autonomous driving state, and FIGS. 17(B) and (C) are diagrams illustrating other examples of the mark (light mark) displayed in the central portion of the steering wheel.

FIG. 19 is a table illustrating driving assistance levels (autonomous driving levels).

MODE FOR CARRYING OUT THE INVENTION

The best embodiment described below is used for easy understanding of the present invention. Therefore, those skilled in the art should note that the present invention is not unreasonably limited by the embodiment described below.

First, reference is made to FIG. 19. FIG. 19 is a table illustrating driving assistance levels (autonomous driving levels). The driving assistance levels (autonomous driving levels) may be classified into level "0" to level "5" as illustrated. At the levels "0" to "2", the driving subject is a person (driver). In other words, the driver has a higher driving responsibility. In addition, at the level "3" to the level "5", the driving subject is a vehicle (the system of the vehicle). In other words, the vehicle has a higher driving responsibility.

In the present specification, an increase in the driving assistance level (autonomous driving level) may be referred to as "expansion of the driving assistance level", and a decrease in the driving assistance level may be referred to as "reduction of the driving assistance level".

Figure 20:
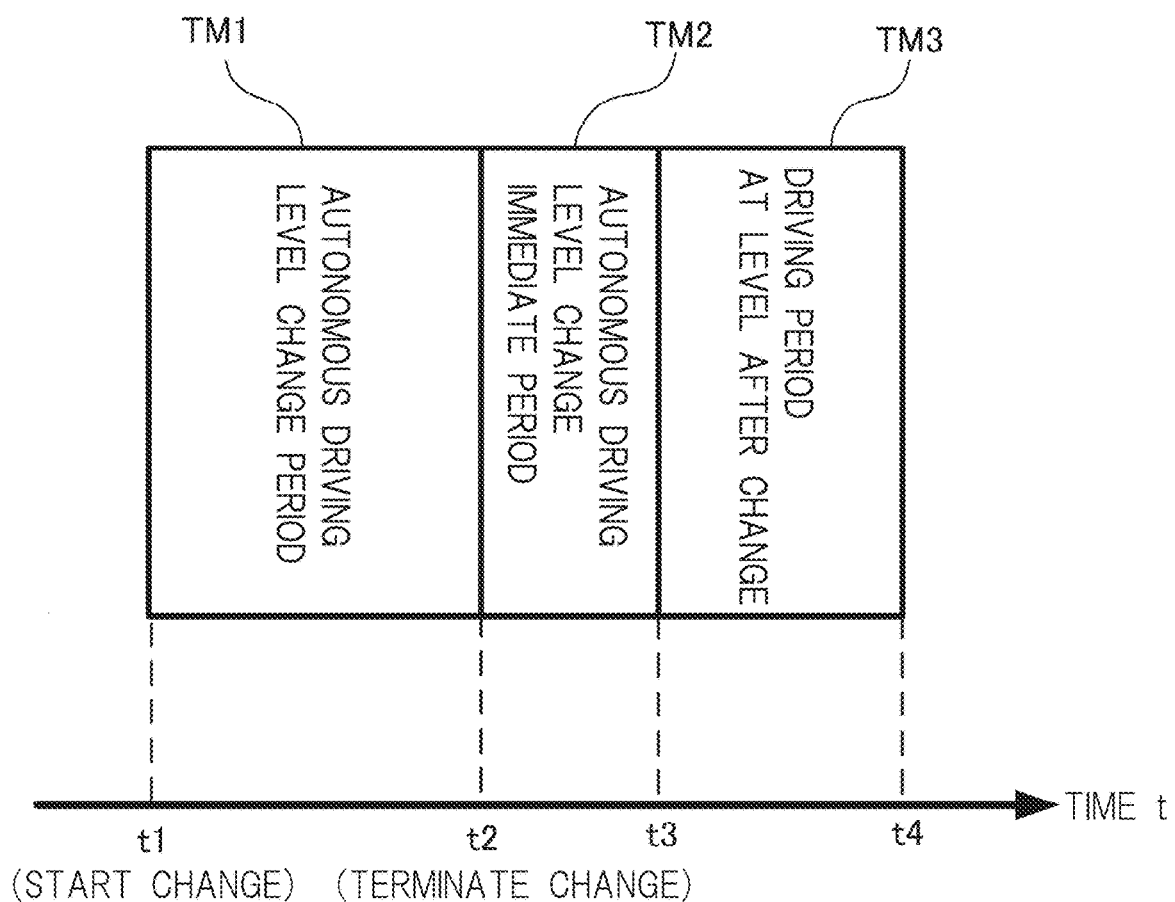
FIG. 20 is a diagram illustrating an example of a caution-needed period in a case where the driving assistance level (autonomous driving level) is changed.

Reference is now made to FIG. 20. FIG. 20 is a diagram illustrating an example of a caution-needed period in a case where the driving assistance level (autonomous driving level) is changed.

In an autonomous driving level change period TM1 (times t1 to t2), the autonomous driving level is changed. The period from the time t2 to a time t3 immediately thereafter is an autonomous driving level change immediate period TM2. The period from the time t3 to a time t4 is a driving period TM3 at the level after the change. In each of the periods TM1 to TM3, it is preferable to appropriately perform information presentation to the driver with light or a combination of light and sound. At this time, preferably, the driver may quickly recognize (understand) the information without a sense of discomfort.

Figure 1:
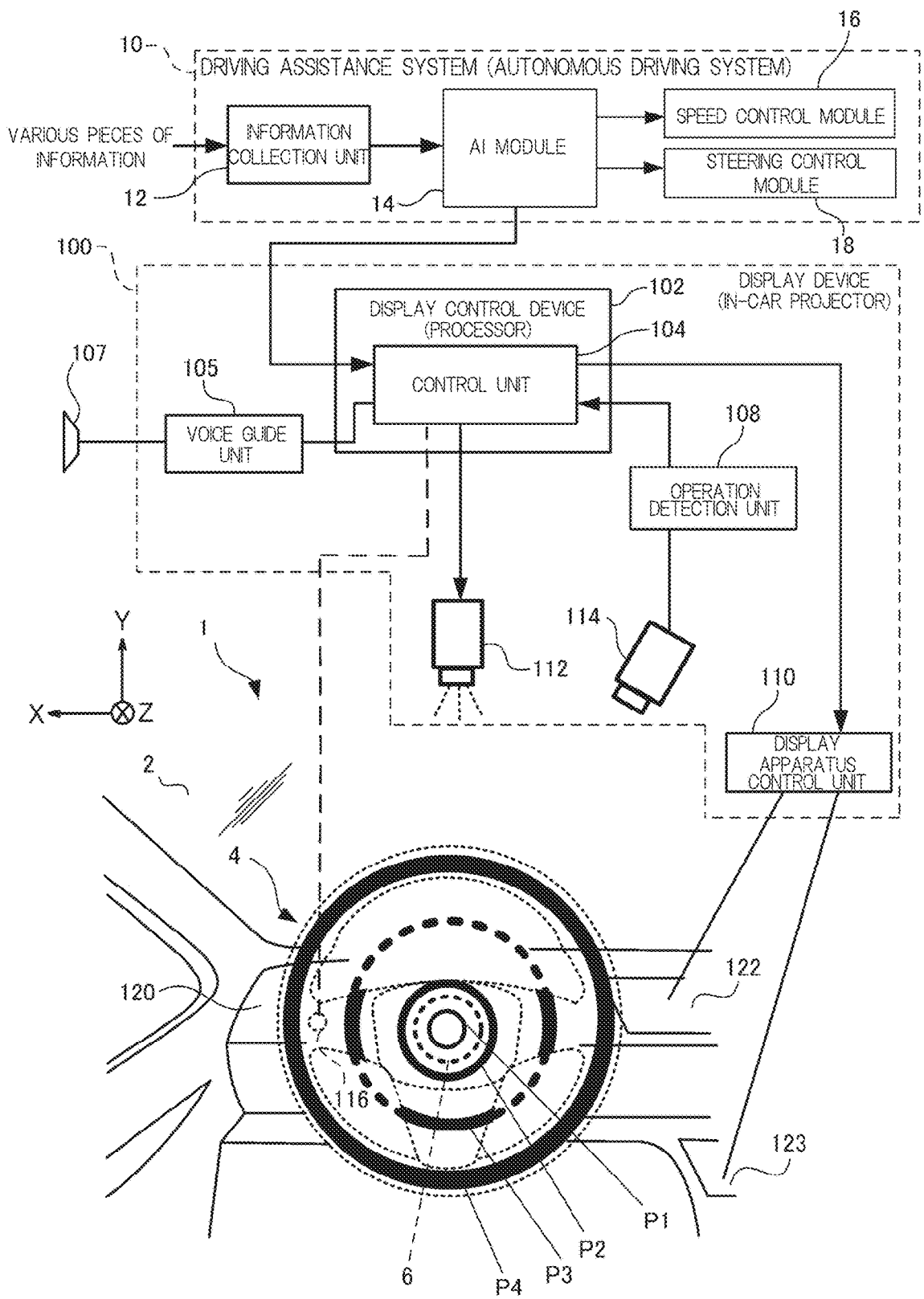
FIG. 1 is a diagram illustrating a configuration example of a driving assistance system and a vehicle display device.

Reference is now made to FIG. 1. FIG. 1 is a diagram illustrating a configuration example of a driving assistance system and a vehicle display device. In FIG. 1, the width direction of the vehicle (the left-right direction as viewed from the driver) is the X direction, the height direction of the vehicle is the Y direction, and the forward direction as viewed from the driver is the Z direction.

A driving assistance system (autonomous driving system) 10 includes an information collection unit 12 that collects various pieces of information from an ECU or the like, an AI module 14, a speed control module 16, and a steering control module 18.

A display device (vehicle display device) 100 may be mounted on a vehicle (own vehicle) 1 as an in-car projector, for example. The display device (vehicle display device) 100 may also be referred to as a display system, a vehicle display system, an information presentation system, or a vehicle information presentation system. Hereinafter, this will be referred to as a "vehicle display device".

The vehicle display device 100 includes a display control device 102 having a function of controlling display in the vehicle, a voice guide unit 105, an operation detection unit 108 that detects an operation of a driver or an occupant by image processing or the like, a display apparatus control unit 110 that controls display by display apparatuses 122 and 123 such as liquid crystal display devices provided on an instrument panel 120 of the vehicle 1, a projector (projection device) 112 that may be a component of an illumination unit, and an operation detection camera 114 that detects an operation of the driver or the occupant.

The display control device 102 includes, for example, one or a plurality of processors. The processor operates in accordance with a computer program stored in the memory, thereby constituting a control unit 104 as a functional block.

In the case of using the computer program, an effective display control method may be implemented simply and easily as long as there is a computer system including a basic configuration such as a processor and a memory.

For example, various pieces of information related to the driving assistance level are supplied to the control unit 104 from the AI module 14 of the driving assistance system (autonomous driving system) 10. For example, when the driving assistance level is changed, the control unit 104 of the display control device 102 is notified in advance that there is a change in the driving assistance level. This notification is supplied to the control unit 104 as, for example, change prediction information.

When the change prediction information is supplied, the control unit 104 performs a display control process (first display control process) to notify the driver of a change in the driving assistance level.

The control unit 104 controls the operation of the projector (projection device) 112, which is a component of the illumination unit, projects an image on a steering wheel 4 of the vehicle 1, and may display a display element having a two-dimensional spread. On the lower side of FIG. 1, concentric circular or annular patterns P1 to P4 are displayed.

However, only a part of a circular or annular pattern is displayed as the pattern P3 displayed on the connecting portions (spokes: reference numerals 9a, 9b, and 9c in FIG. 2(B)) of the steering wheel 4.

Both the circle and the circular ring have a circular outer shape, but the circular ring has a larger line width. The pattern P3 becomes an arc-shaped "linear pattern" when a circle pattern is projected, and becomes an arc-shaped "band-like pattern" when a circular ring pattern is projected.

It may be assumed that the "illumination unit" is configured by the projector (projection device) 112 alone, is configured by the projector 112 and a light emitting unit (including at least one light emitting element 116) provided in the steering wheel 4 of the vehicle 1, or is configured by the light emitting unit (including the plurality of (a large number of) light emitting elements 116) alone provided in the steering wheel 4.

For example, an applied use example may be assumed in which only the projector 112 is used at night, and the projector 112 and the light emitting unit including at least the one light emitting element 116 are used in combination or only the light emitting unit including the plurality of light emitting elements 116 is used in an environment in which the intensity of external light is high in the daytime.

In the following description, a case where a projection image is displayed on the steering wheel 4 by the projector 112 will be described.

The projector 112 includes a light source and an optical system for projection (not illustrated). Further, the control unit 104 may control the operation of the voice guide unit 105 to output voice (guide voice) via a speaker 107.

Figure 9:
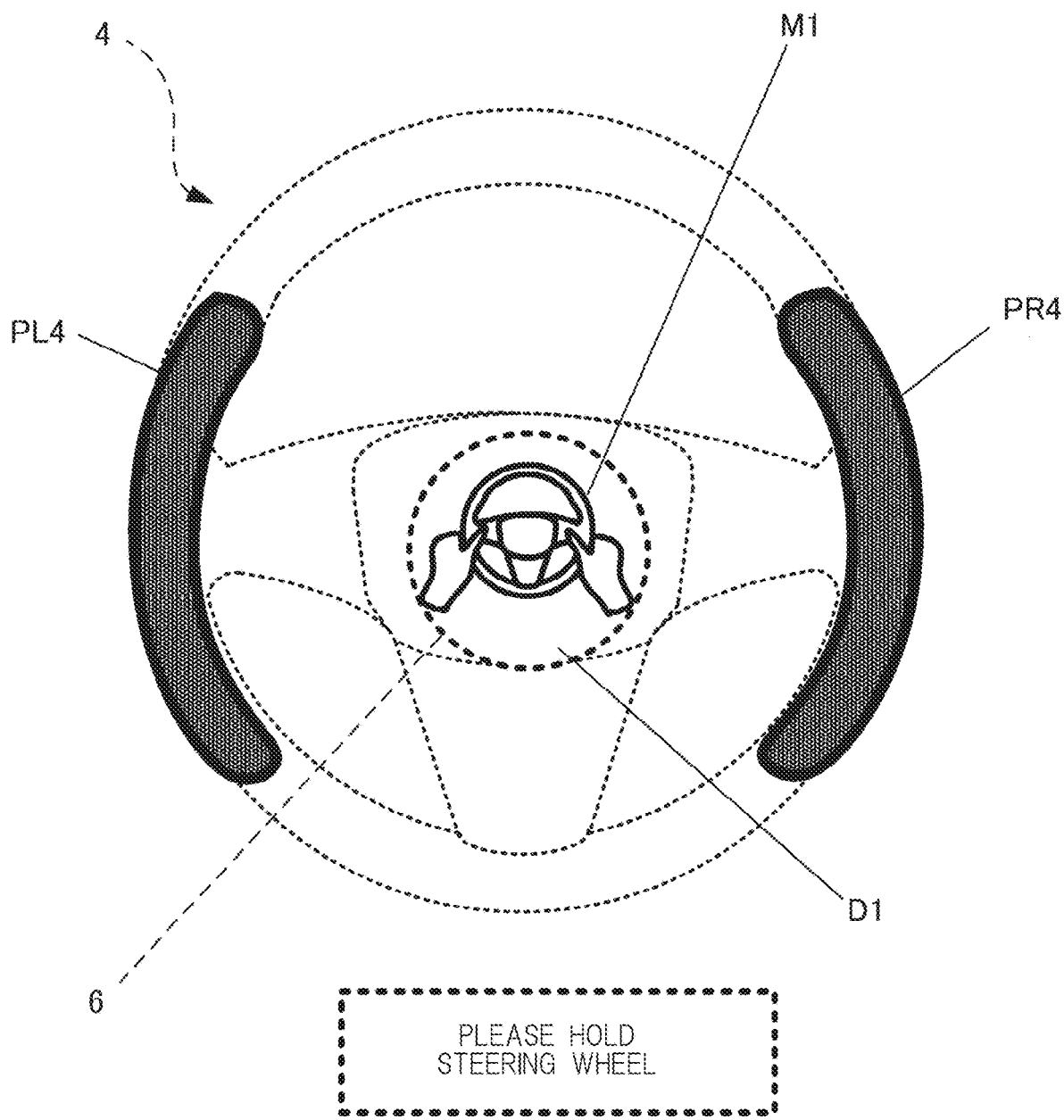
FIG. 9 is a diagram illustrating an example in which an icon indicating a driving state (driving mode) is displayed at a central portion of the steering wheel.

For example, the control unit 104 may prompt the driver to grip the steering wheel by outputting the guide voice "Please hold the steering wheel", and at the same time, may display a gripping region in the steering wheel 4 by, for example, a linear or band-like display piece (light strip) (see FIG. 9. This point will be described below).

When the driver grips the steering wheel 4, the operation detection unit 108 analyzes the image captured by the operation detection camera 114 and detects the gripping operation, and the control unit 104 stops the output of the guide voice and the display of the display piece based on the detection information.

Further, a concave portion 6 having a circular outer shape (a circle indicating the outer shape is indicated by a broken line in FIG. 1) is provided in a central portion (the reference numeral 7 in FIG. 2 (B)) of the steering wheel 4. The circular concave portion 6 may be used as a central display region (the reference numeral D1 in FIG. 2(B)) that displays a light mark including character, figure, symbol, and the like as a component.

In addition, since the operation detection unit 108 detects a step (edge) of the circular concave portion 6 by image analysis, for example, it is easy to accurately specify the position of the center of the concentric circle.

The annular patterns P1 to P4 formed on the steering wheel 4 are preferably drawn in perspective (including linear perspective and aerial perspective), and thus the driver may perceive one stereoscopic image having a sense of depth (see FIGS. 4(A), (B), and 5: details will be described below).

Further, by dynamic display control such as displaying the patterns P1 to P4 at different times, it is also possible to make the driver feel a motion from the front portion of the vehicle 1 toward the steering wheel 4 or a motion from the steering wheel 4 toward the front portion of the vehicle 1 (this point will also be described below).

Reference is now made to FIG. 2. FIG. 2(A) is a diagram illustrating an arrangement example of the projection device forming the illumination unit in the vehicle, FIG. 2(B) is a front view of the steering wheel, and FIG. 2(C) is a diagram illustrating annular patterns (the first display element and the third display element) and a band-like pattern (second display element) projected on the steering wheel.

In FIG. 2, the same components as those in FIG. 1 are denoted by the same reference numerals. This also applies to the subsequent drawings. In addition, FIG. 2(C) is the same as the lower section illustrated in FIG. 1.

As illustrated in FIG. 2(A), the projector 112 is installed near the ceiling of the vehicle 1. A driver 3 sits on a seat 132 and looks forward. The projector 112 may form a display with light by projecting an image onto a front surface of the steering wheel 4 on the driver 3 side.

As illustrated in FIG. 2(B), the steering wheel 4 includes the central portion (hub or boss) 7, an outer edge (rim) 5, and the connecting portions 9a, 9b, and 9c that connect the central portion 7 and the outer edge 5, and has a structure with a two-dimensional spread when viewed from the driver 3. By using each of the above-described portions as a display region of a display element (a pattern, a mark, or the like), it is possible to display an image having a two-dimensional spread.

The outer shape of the steering wheel 4 is typically a symmetrical (bilaterally symmetrical) shape that is symmetrical with respect to the right and left. By using this, for example, it is possible to realize rendering of the display that gives the driver 3 a sense such that ripples are spreading, or rendering of the display that gives the driver 3 a sense such that the spread ripples are conversely shrinking toward the center of the circle.

As an example, assuming three concentric circles of a small-sized circle (small circle), a medium-sized circle (medium circle), and a large-sized circle (large circle) sharing the center, when the small circle is displayed in the central portion, a part of the medium circle is displayed in the connecting portion, and the large circle is displayed in the outer edge having an annular shape, for example, it is also possible to form a symmetrical pattern (a pattern which gives a sense of a two-dimensional spread) in a ripple shape which spreads from the center to the outside (see FIG. 2(C)).

Here, for example, it is possible to cause the driver to perceive an image having a sense of depth (stereoscopic effect) by the above-described rendering of each pattern (for example, an expression method devised to generate a predetermined effect), and it is also possible to give a motion to the image by the above-described rendering effect. In other words, it is possible to make the driver 3 feel the motion toward the predetermined direction by the rendering of the dynamic display.

Figure 3:
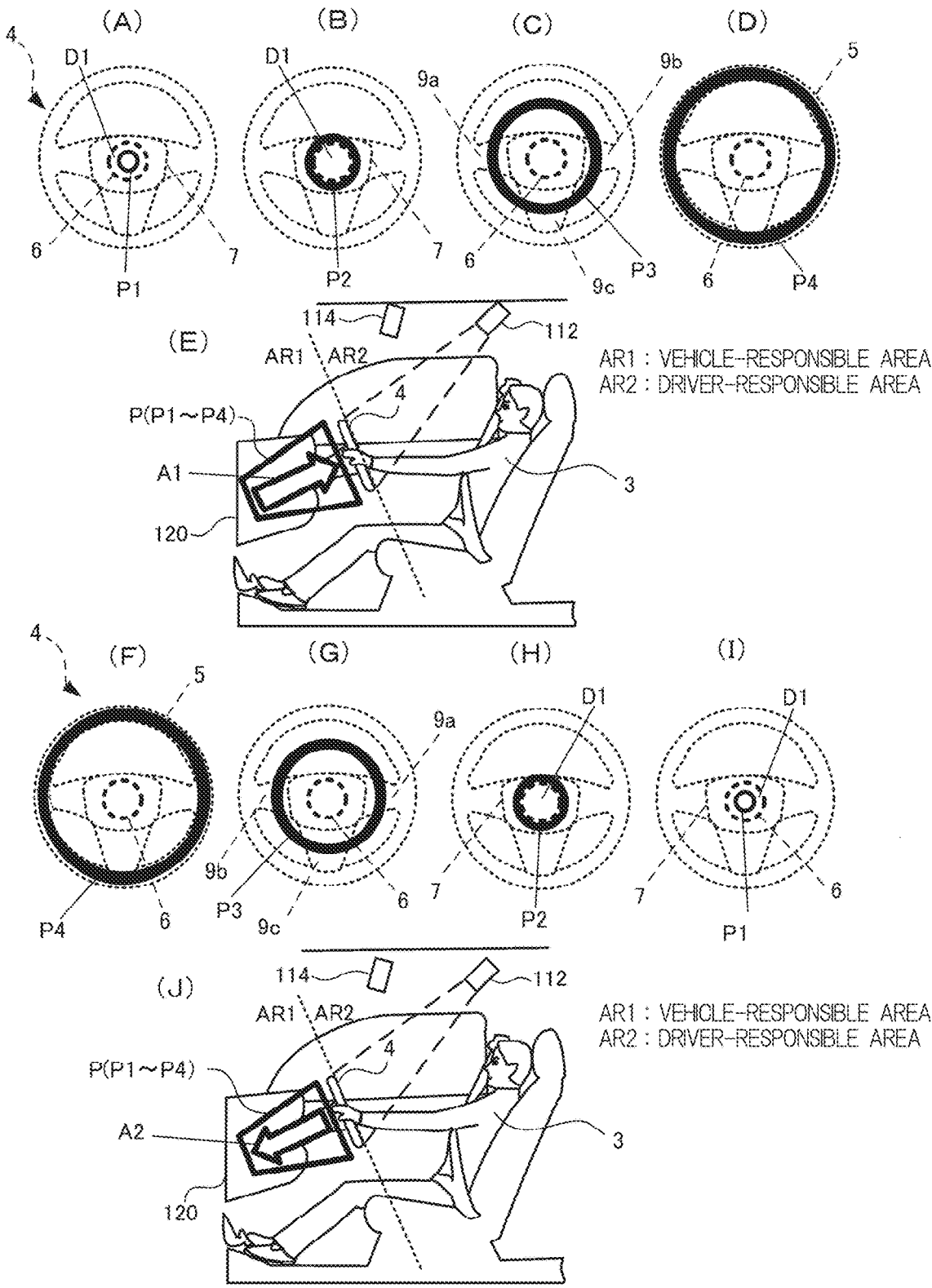
FIGS. 3(A) to (E) are diagrams illustrating an example of generating a sense (first sense) in which the driving responsibility shifts from the vehicle to a driver.
FIGS. 3(F) to (J) are diagrams illustrating an example of generating a sense (second sense) in which the driving responsibility shifts from the driver to the vehicle.

This point will be specifically described. Reference is made to FIG. 3. FIGS. 3(A) to (E) are diagrams illustrating an example of generating a sense (first sense) in which the driving responsibility shifts from the vehicle to the driver, and FIGS. 3(F) to (J) are diagrams illustrating an example of generating a sense (second sense) in which the driving responsibility shifts from the driver to the vehicle.

As described above, the control unit 104 of the display control device 102 controls the illumination unit (here, the projector 112) capable of forming a display with light on the steering wheel 4 including the central portion 7, the outer edge 5, and the connecting portions 9a to 9c and controls rendering of the display with light.

For example, the rendering by a first display element (the patterns P1 and P2 in FIGS. 3 (A) and (B)) formed in the central portion 7 of the steering wheel 4, a second display element (the pattern P3 in FIG. 3(C)) formed in the connecting portions 9a to 9c, and a third display element (the pattern P5 in FIG. 3(D)) formed in the outer edge 5 are controlled.

Each of the display elements P1 to P4 is displayed in perspective so that it is possible to make the driver 3 feel a stereoscopic image having a sense of depth. In addition, the patterns are displayed at different times in the order of FIGS. 3(A) to 3(D) so that the driver 3 may feel a motion from the front portion (leading end portion) of the vehicle 1 toward the steering wheel 4 as indicated by the arrow A1 in FIG. 3(E).

In the examples of FIGS. 3(A) to (D), the patterns P1 to P4 are displayed at different times, but the present invention is not limited thereto. For example, the patterns P1 to P4 are simultaneously displayed, and first, the luminance or brightness of the pattern P1 is instantaneously increased, and thereafter, similar changes in the display state are generated at different times in the patterns P2, P3, and P4 in this order, and thus the same sense of motion may be given to the driver.

Even when the display timing of each of the display elements is shifted on the time axis, a small timing difference allows the driver to perceive (recognize) one image due to an afterimage effect (an effect in which, when a viewer sees light or an image, the light or the image that the viewer has seen remains even after the light or the image disappears).

When the driving assistance level is reduced and the driving subject shifts from the vehicle to the driver, the rendering of the display with the light illustrated in FIGS. 3(A) to (D), for example, makes it possible to cause the driver 3 to have the first sense (the movement sense indicated by the arrow A1 in FIG. 2(E)) in which the driving responsibility of the vehicle 1 moves from the front portion in front of the steering wheel 4 toward the steering wheel 4 in the vehicle 1.

In addition, the steering wheel 4 may be regarded as a structure that spatially divides (partitions) the front portion (leading end portion) of the vehicle 1 and the driver 3.

Here, as illustrated in FIG. 2(E), one virtual plane (indicated by a broken line in the drawing) that is in contact with the surface of the steering wheel 4 and has a two-dimensional spread in the real space is assumed, and a virtual first responsible area (vehicle-responsible area) AR1 and a virtual second responsible area (driver-responsible area) AR2 are set on the front portion side of the vehicle 1 and the driver 3 side, respectively, with the plane as a boundary.

For example, when the concept of the above first and second responsible areas is described in an explanation manual of the vehicle display device, the driver who reads the explanation manual learns and memorizes the concept of the responsible areas.

Therefore, when the above-described first sense is generated during the driving of the vehicle 1, the concept of the responsible area by the learning is instantaneously recalled, and it is possible to instantaneously recognize (understand) that the movement has been made from the first responsible area AR1 to the second responsible area AR2. Therefore, the driver 3 may quickly, clearly, and reliably understand that the driving assistance level has been reduced.

When the driving assistance level is expanded and the driving subject shifts from the driver to the vehicle, the rendering for displaying the display patterns P4 to P1 is performed in the order of FIGS. 3(F) to 3(I). As a result, it is possible to cause the driver 3 to have the motion sense (second sense) of moving from the steering wheel 4 to the front portion of the vehicle 1 as indicated by the arrow A2 in FIG. 3(J).

In this case, the driver 3 may instantaneously recognize the shift from the second responsible area AR2 to the first responsible area AR1.

In this way, at the time of changing the driving assistance level (which may be rephrased as the autonomous driving level, the driving mode, or the like), the display control (rendering by the display elements) is performed to cause the driver to have at least one of the first sense from the far side toward the near side and the second sense from the near side toward the far side when viewed from the driver so that the driver may intuitively recognize the change content without a sense of discomfort.

The driver 3 does not follow the movement of the display element with the eyes and confirm and understand the moving direction as in the related art, but intuitively understands the change content, and therefore instantaneous understanding is realized. Therefore, it is possible to shorten the time required for the driver to understand that the driving mode has been changed. This also contributes to safe driving and the like.

Among the central portion 7, the connecting portions 9a to 9c, and the outer edge 5 of the steering wheel 4, for example, the connecting portions 9a to 9c may not be used as regions where the display elements are formed. However, in this case, it is considered that expressive rendering of not forming the display elements in the connecting portions 9a to 9c is performed. Therefore, such an example is also included in the technical scope of the present invention.

Reference is now made to FIG. 4. FIGS. 4(A) and (B) are diagrams illustrating an example in which the first display element to the third display element are expressed in perspective in order to cause the driver to perceive an image having a sense of depth (stereoscopic effect).

The rendering of causing the driver 3 to perceive a stereoscopic image having a sense of depth by linear perspective or a combination of linear perspective and aerial perspective will be described.

Here, "perspective" is a method of visually expressing a sense of perspective. The "linear perspective" is an expression method of expressing, by line drawing, a perspective in which an object appears smaller as the distance increases from the near side toward the far side.

The "aerial perspective method" is originally "a perspective expression method using the fact that the light entering the eyes is actually affected by air (atmosphere), and therefore an object farther from the viewpoint is more bluish or has a more unclear contour line and looks hazy due to a large amount of air interposed between the viewpoint and the object" and typically is "a method of expressing a sense of perspective by drawing a distant object so as to look fainter and hazier and is an expression method also capable of applying perspective using a color, color tone, and the like (hue, contour, shade, etc.).

As an example of the use of the aerial perspective, for example, it may be assumed that the driver feels that the third display element is positioned close to the driver, the second display element is positioned further away, and the first display is positioned even further away by increasing the luminance or brightness and increasing the sharpness of the first display element, the second display element, and the third display element in this order. Thus, an image having a stereoscopic effect (sense of depth) may be displayed to the driver.

In the display example of FIG. 4(A), it is assumed that the annular patterns P1 to P4 are not colored. However, in FIG. 4(A), since the size increases in the annular patterns P1 to P4 in this order, it may be said that the annular patterns P1 to P4 are expressed by the linear perspective method. Therefore, it is possible to make the driver feel a stereoscopic image having a sense of depth.

Further, by the dynamic display control at different times as illustrated above in FIGS. 3(A) to (D) or FIGS. 3(F) to (I), it is possible to cause the driver 3 to have the movement sense (the firsts sense or the second sense) as indicated by the arrow AR1 in FIG. 3(E) or the arrow A2 in FIG. 3(J).

In the example of FIG. 4(B), the annular patterns P1 to P4 are colored in blue, for example. However, the shading is different. Since the density increases in the patterns P1 to P4 in this order, the pattern P1 appears hazy to the driver 3, and the sharpness appears to increase in the patterns P2 to P4 in this order. Therefore, the driver 3 may feel a clearer stereoscopic image.

Further, by the dynamic display control at different times as illustrated above in FIGS. 3(A) to (D) or FIGS. 3(F) to (I), it is possible to cause the driver 3 to have the movement sense (the first sense or the second sense) as indicated by the arrow AR1 in FIG. 3(E) or the arrow A2 in FIG. 3(J) more clearly.

Figure 5:
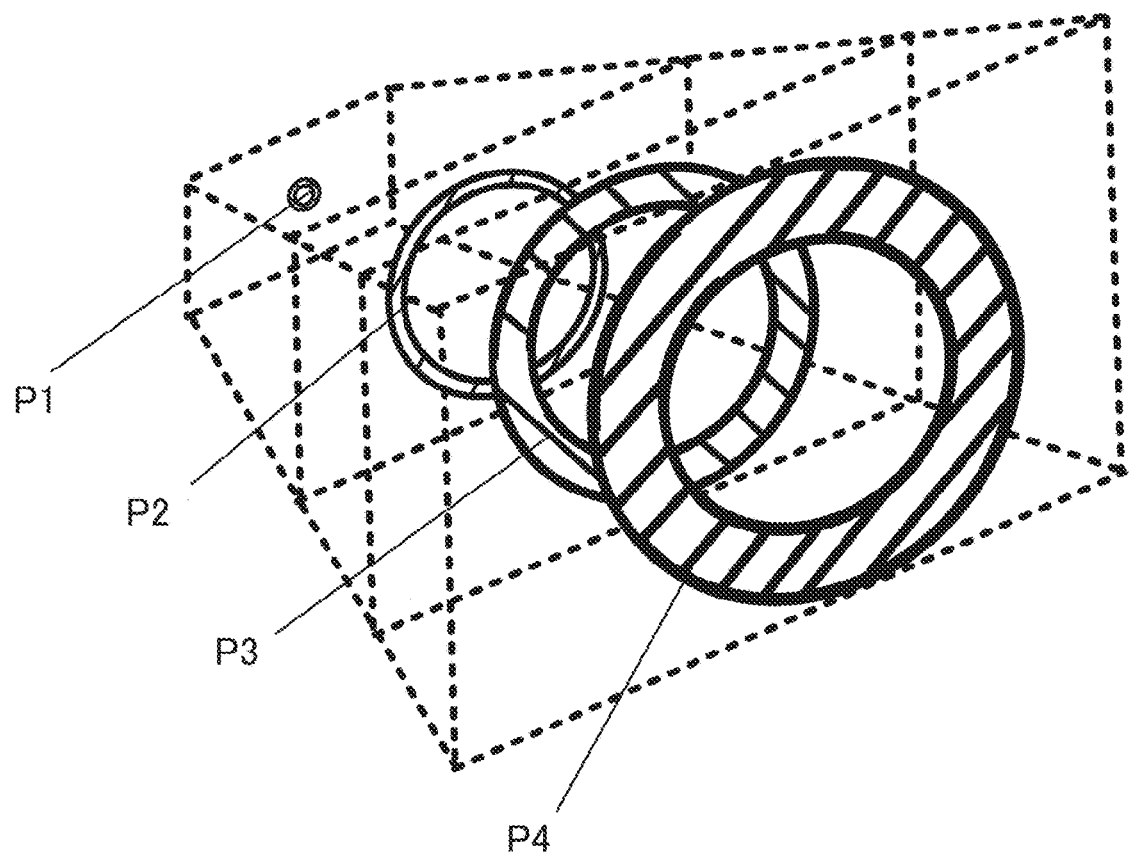
FIG. 5 is a diagram illustrating another example in which the first display element to the third display element are expressed in perspective in order to cause the driver to perceive an image having a sense of depth (stereoscopic effect).

Reference is now made to FIG. 5. FIG. 5 is a diagram illustrating another example in which the first display element to the third display element are expressed in perspective in order to cause the driver to perceive an image having a sense of depth (stereoscopic effect).

In the example of FIG. 5, the annular patterns P1 to P4 are colored and have different colors. For example, the pattern P1 is light blue, the pattern P2 is blue, the pattern P3 is yellow, and the pattern P4 is red, and in this manner, a cold color (contractive color) such as light blue or blue is used for a pattern which is felt to be far from the driver 3, and a warm color (expansive color) such as yellow or red is used for a pattern which is felt to be close to the driver 3 so that a sense of depth is generated more clearly.

Figure 6:
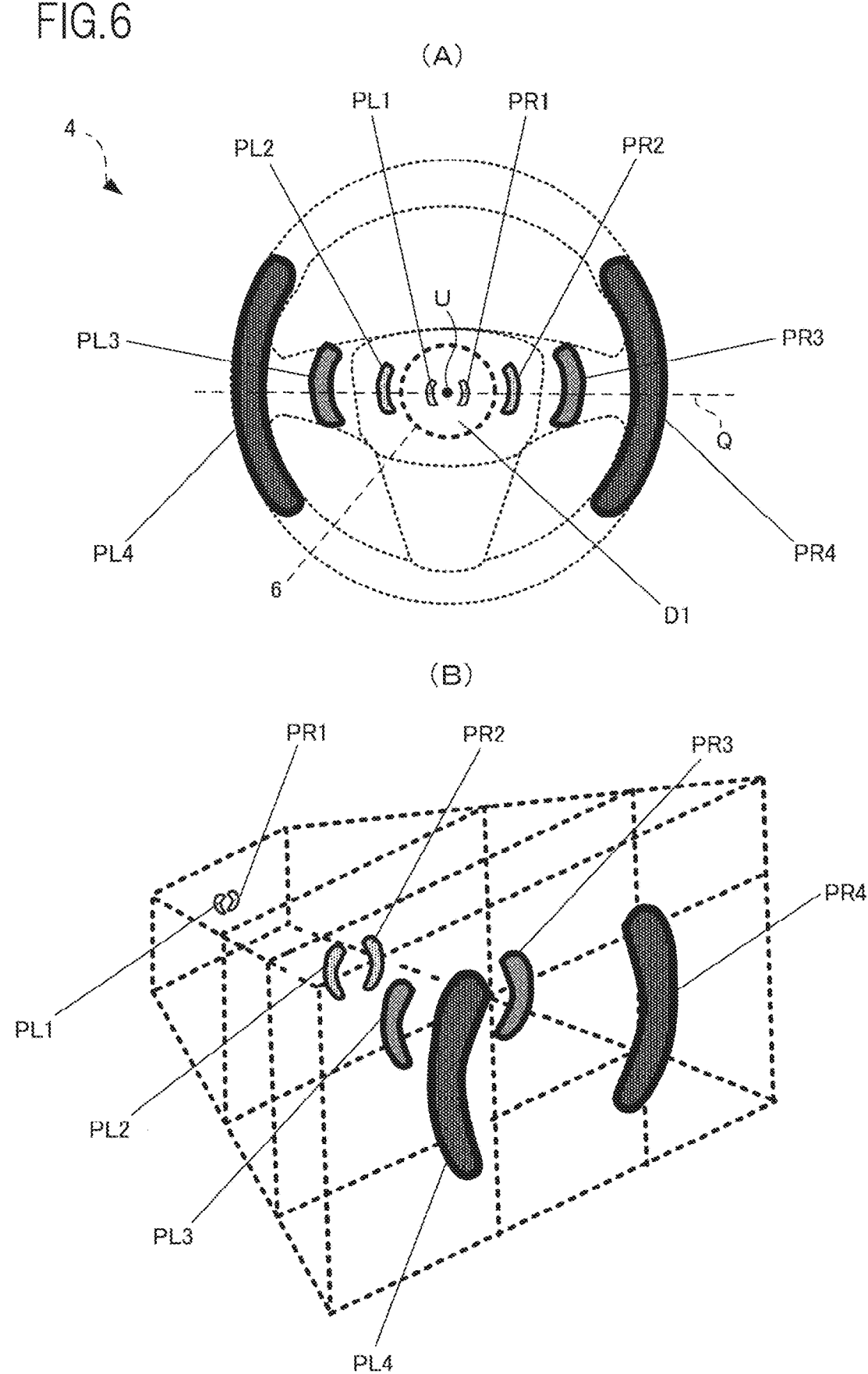
FIG. 6(A) is a diagram illustrating a display example of a pair of separated linear or band-like patterns (the first display element, the second display element, and the third display element) displayed on the steering wheel.
FIG. 6(B) is a diagram illustrating an example in which the first display element to the third display element illustrated in FIG. 6(A) are expressed in perspective in order to cause the driver to perceive an image having a sense of depth (stereoscopic effect).

Reference is now made to FIG. 6. FIG. 6(A) is a diagram illustrating a display example of a pair of separated linear or band-like patterns (the first display element, the second display element, and the third display element) displayed on the steering wheel, and FIG. 6(B) is a diagram illustrating an example in which the first display element to the third display element illustrated in FIG. 6(A) are expressed in perspective in order to cause the driver to perceive an image having a sense of depth (stereoscopic effect).

In the example of FIG. 6(A), the display element is formed by a pair of separated linear or band-like display pieces (light strips).

A pair of arc-shaped display pieces PL1 and PR1 and PL2 and PR2, which are displayed separately on the left and right sides, are the first display elements formed in the central portion 7 of the steering wheel 4. A pair of display pieces PL3 and PR3 are the second display elements formed on the left and right connecting portions 9a and 9b of the steering wheel 4. A pair of display pieces PL4 and PR4 is the third display elements formed on the outer edge 5 of the steering wheel 4.

Each of the display pieces (PL1 to PLA, PR1 to PL4) is preferably arranged on a virtual concentric circle (see, for example, the patterns P1 to P4 in FIGS. 3(A) to (D)) centered on one point (the symbol U in FIG. 6(A)) set in the central portion 7 of the steering wheel 4 and on a virtual straight line (the symbol Q in FIG. 6(A)) passing through the one point U and intersecting with each concentric circle.

When a pair of separated linear or band-like display pieces, such as arcs along the outer circumference of a concentric circle (concentric annular ring) is used, not only the change content of the driving assistance level but also other useful information may be transmitted to the driver in an easily understandable manner.

For example, when the driving assistance is reduced and the manual driving mode is set, the region of the outer edge 5 of the steering wheel 4 gripped by the driver 3 may be indicated by the display piece, or the display position of the display piece may be changed to prompt the driver 3 to, for example, step on the brake or check the front by the display piece.

Further, by changing the position of the display piece in accordance with the automatic rotation of the steering wheel after the mode is switched to the autonomous driving mode, the driver may easily know that the autonomous driving is being performed smoothly and may obtain a sense of security.

Further, when each of the display pieces is displayed, each of the pair of display pieces is displayed (arranged) on each concentric circle (concentric annular ring) and on the straight line passing through the center of the circle (annular ring) and intersecting with each circle (annular ring) (in other words, the straight line forming the diameter of the maximum circle), for example, while maintaining the balance between the right and left so that an image symmetrical with respect to the right and left may be displayed without a sense of discomfort. A specific display example will be described below.

FIG. 6(B) corresponds to FIG. 4(B) described above. An image having a sense of depth is formed by using both the linear perspective and the aerial perspective. Each display element is colored in blue, for example. However, the density is different, and the display element seen on the near side has higher sharpness.

Figure 7:
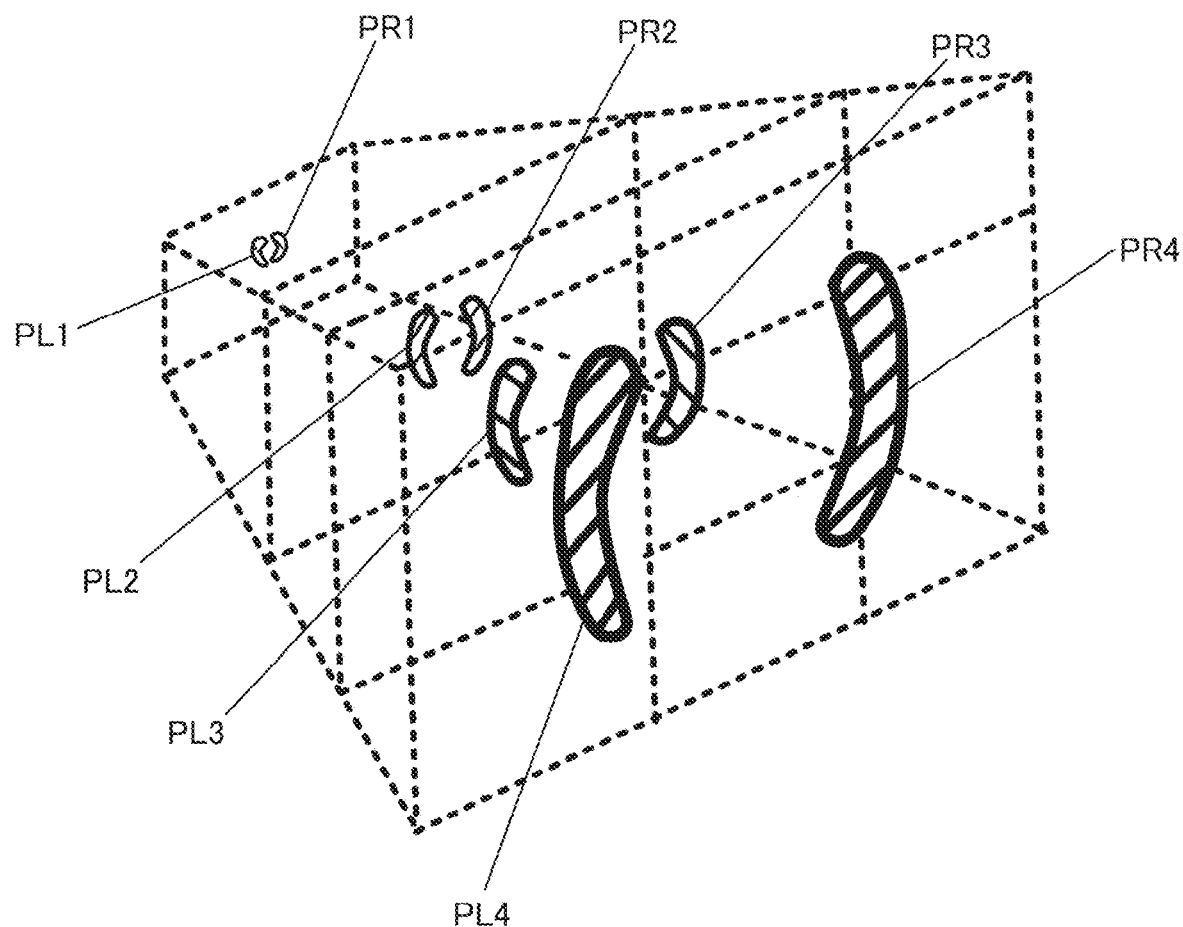
FIG. 7 is a diagram illustrating another example in which each of the first display element to the third display element illustrated in FIG. 6(A) is expressed in perspective in order to cause the driver to perceive an image having a sense of depth (stereoscopic effect).

Reference is now made to FIG. 7. FIG. 7 is a diagram illustrating another example in which each of the first display element to the third display element illustrated in FIG. 6(A) is expressed in perspective in order to cause the driver to perceive an image having a sense of depth (stereoscopic effect).

FIG. 7 is a diagram corresponding to FIG. 5 described above. An image having a sense of depth is formed by using both the linear perspective and the aerial perspective. Each display element (display pattern) is colored and has a different color. A cold color (contractive color) such as light blue or blue is used for a pattern which is felt to be far from the driver 3, and a warm color (expansive color) such as yellow or red is used for a pattern which is felt to be close to the driver 3, whereby a sense of depth may be generated more clearly.

Figure 8:
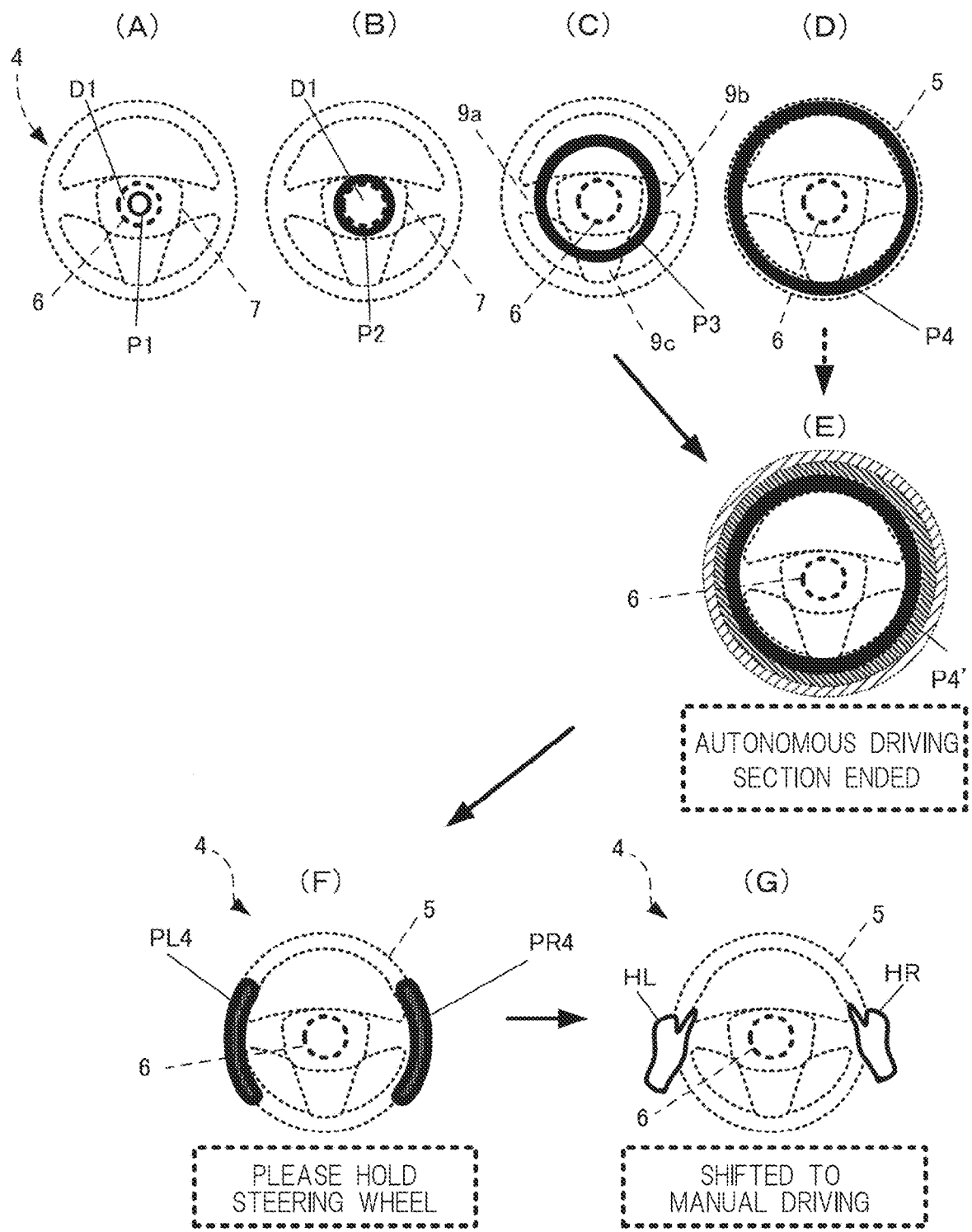
FIGS. 8(A) to (G) are diagrams illustrating a display example (including a display indicating a change in the driving assistance level by the annular pattern, an emphasized display, and a display of a gripping position) and a voice guide example in a case where the driving responsibility shifts from the vehicle to the driver.

Reference is now made to FIG. 8. FIGS. 8(A) to (G) are diagrams illustrating a display example (including a display indicating a change in the driving assistance level by the annular pattern, an emphasized display, and a display of a gripping position) and a voice guide example in a case where the driving responsibility shifts from the vehicle to the driver.

In the example of FIG. 8, when the driver 3 is caused to feel a motion (the first sense) from the far side toward the near side, an emphasis process is performed on the display element at the timing when the display element is displayed on the outer edge 5 of the steering wheel 4 or after the timing.

FIGS. 8(A) to (D) are the same as FIGS. 3(A) to (D) described above. After the display of FIG. 8(C) or 8(D) is performed, the display shifts to that of FIG. 8(E).

In FIG. 8(E), the pattern P4 displayed on the outer edge 5 of the steering wheel 4 is subjected to the emphasis process. The pattern after the emphasis process is denoted by the reference sign P4'.

The "emphasis process" may be performed by, for example, temporarily increasing the luminance or brightness of the annular pattern or the display piece, or temporarily blinking the pattern or the display piece. In other words, the "emphasis process" may be referred to as "the process of temporarily changing the display state to improve the noticeability".

For example, by making the driver look at the display, it is possible to prevent the driver from overlooking the change in the driving assistance level by impressing the driver that the driving assistance level has been changed and to make the driver reliably recognize the change content in the driving assistance level. In addition, when the driving responsibility shifts from the vehicle 1 to the driver 3, it is possible to obtain an advance preparation effect of clearly informing the driver 2 that the driver 2 has the driving responsibility and making the driver 2 prepare to hold the steering wheel 4 (making the driver 2 have mental preparation in advance).

Further, in FIG. 8(E), the guide voice "Autonomous driving section ended" is output from the speaker 107 (see FIG. 1).

By using the voice guidance together, information may be transmitted more accurately. In addition, since the driver may recognize the driving situation and the like through the sense of sight and the sense of hearing, understanding of information is promoted.

After the display of FIG. 8(E), the process shifts to FIG. 8(F). In FIG. 8(F), the linear or band-like display pieces PL4 and PR4 are displayed at left and right positions of the outer edge 5 of the steering wheel 4, thereby indicating the gripping position of the steering wheel 4 to the driver 3. In addition, the guide voice "Please hold the steering wheel" is output from the speaker 107.

After the display of FIG. 8(F), the process shifts to FIG. 8(G). In FIG. 8(G), the guide voice "Shifted to manual driving" is output from the speaker 107.

Reference is now made to FIG. 9. FIG. 9 is a diagram illustrating an example in which an icon indicating a driving state (driving mode) is displayed at the central portion of the steering wheel.

FIG. 9 is a diagram corresponding to FIG. 8(F) described above. In FIG. 9, an icon M1 prompting the driver to hold the steering wheel is further displayed in a central display region D1 of the central portion 7 of the steering wheel 4.

In this way, by displaying the light mark including at least one of a character, a figure, and a symbol indicating the driving state, the driving situation, or the information regarding the subsequent operation to be performed by the driver in the central display region D1, it is possible to display useful information to the driver in an easily viewable or understandable manner.

Figure 10:
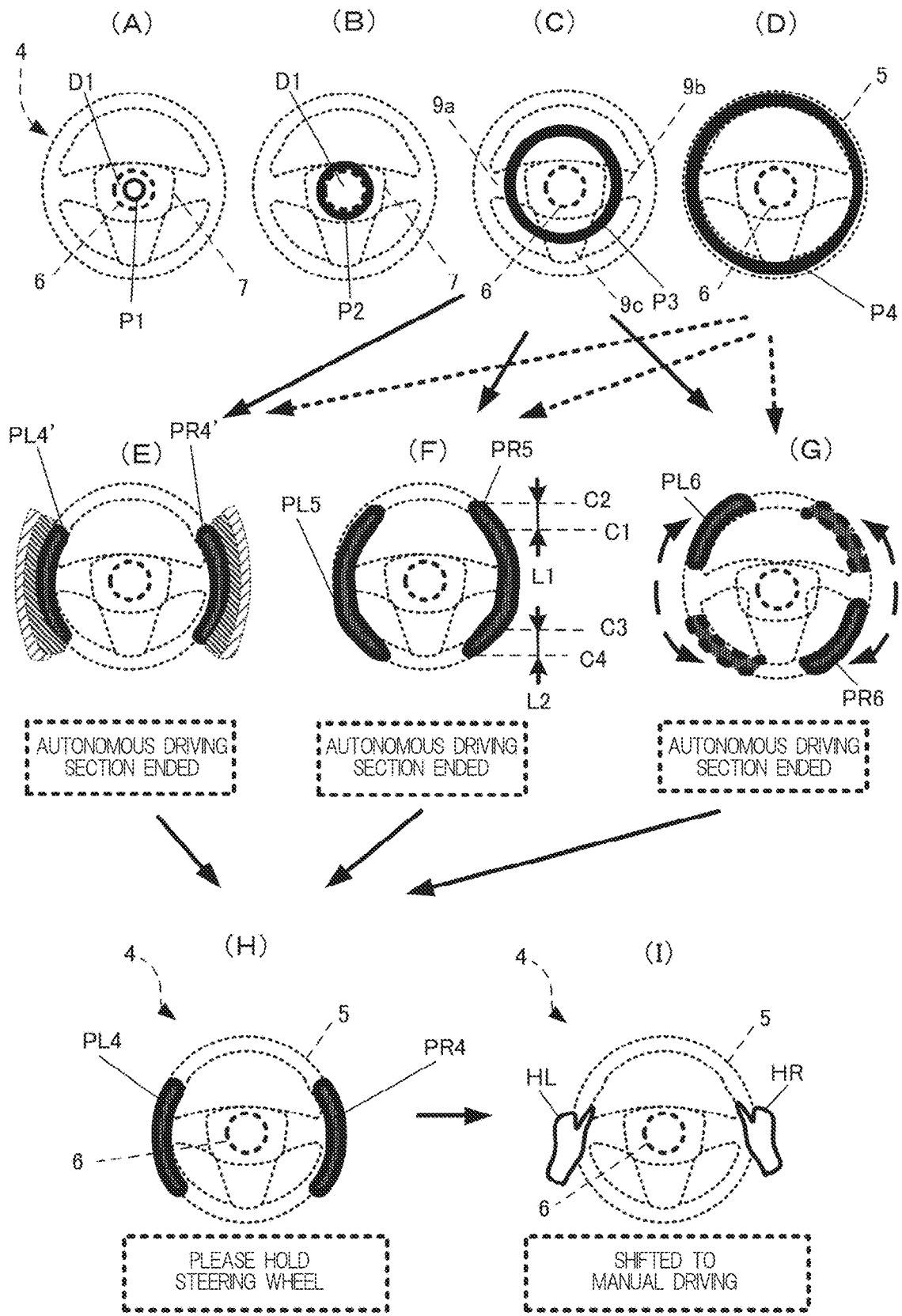
FIGS. 10(A) to (I) are diagrams illustrating a display example (including a display indicating a change in the driving assistance level by separated linear or band-like patterns, an emphasized display, and a display of the gripping position) and a voice guide example in a case where the driving responsibility shifts from the vehicle to the driver.

Reference is now made to FIG. 10. FIGS. 10(A) to (I) are diagrams illustrating a display example (including a display indicating a change in the driving assistance level by separated linear or band-like patterns, an emphasized display, and a display of the gripping position) and a voice guide example in a case where the driving responsibility shifts from the vehicle to the driver.

FIG. 10 is a diagram corresponding to FIG. 8 described above. In FIG. 10, an emphasis process is performed on a linear or band-like display element (pattern) (FIGS. 8(E) to (G)).

FIGS. 10(A) to (D) are the same as FIGS. 8(A) to (D). FIGS. 10(H) and (I) are the same as FIGS. 8(F) and (G).

In FIG. 10, instead of FIG. 8(E), the emphasized display of any of FIGS. 10(E) to (H) is performed.

The emphasis process may be performed after the display of FIG. 10(D), or after FIG. 10(C), FIG. 10(D) may be omitted, and the process may proceed to the display of any of FIGS. 10(E) to (F).

In FIG. 10(E), the luminance or brightness of a pair of separated linear or band-like (in this case, arc-like) display pieces (light strips) PL4' and PR4' are temporarily increased, or the color, hue, or saturation is temporarily changed to increase the noticeability.

In FIG. 10(F), display pieces PL5 and PR5 are temporarily extended. When FIGS. 10(E) and 10(F) are compared with each other, the display piece in FIG. 10(F) extends upward by L1 and extends downward by L2.

In FIG. 10(G), a pair of display pieces PL6 and PR6 are swung along the outer edge 5 of the steering wheel 4.

In FIGS. 10(E) to (G), the guide voice "Autonomous driving section ended" is output from the speaker 107. It is also possible to output the guide voice "Please hold the steering wheel".

In this way, it is possible to temporarily improve the noticeability by temporarily changing the color or the like of the display piece, temporarily changing the length, or controlling the position of the display piece such that the display piece is moved as if the display piece is swinging. Therefore, the driver 3 may have mental preparation in advance for the subsequent action to be taken. This contributes to secure and safe driving.

Figure 11:
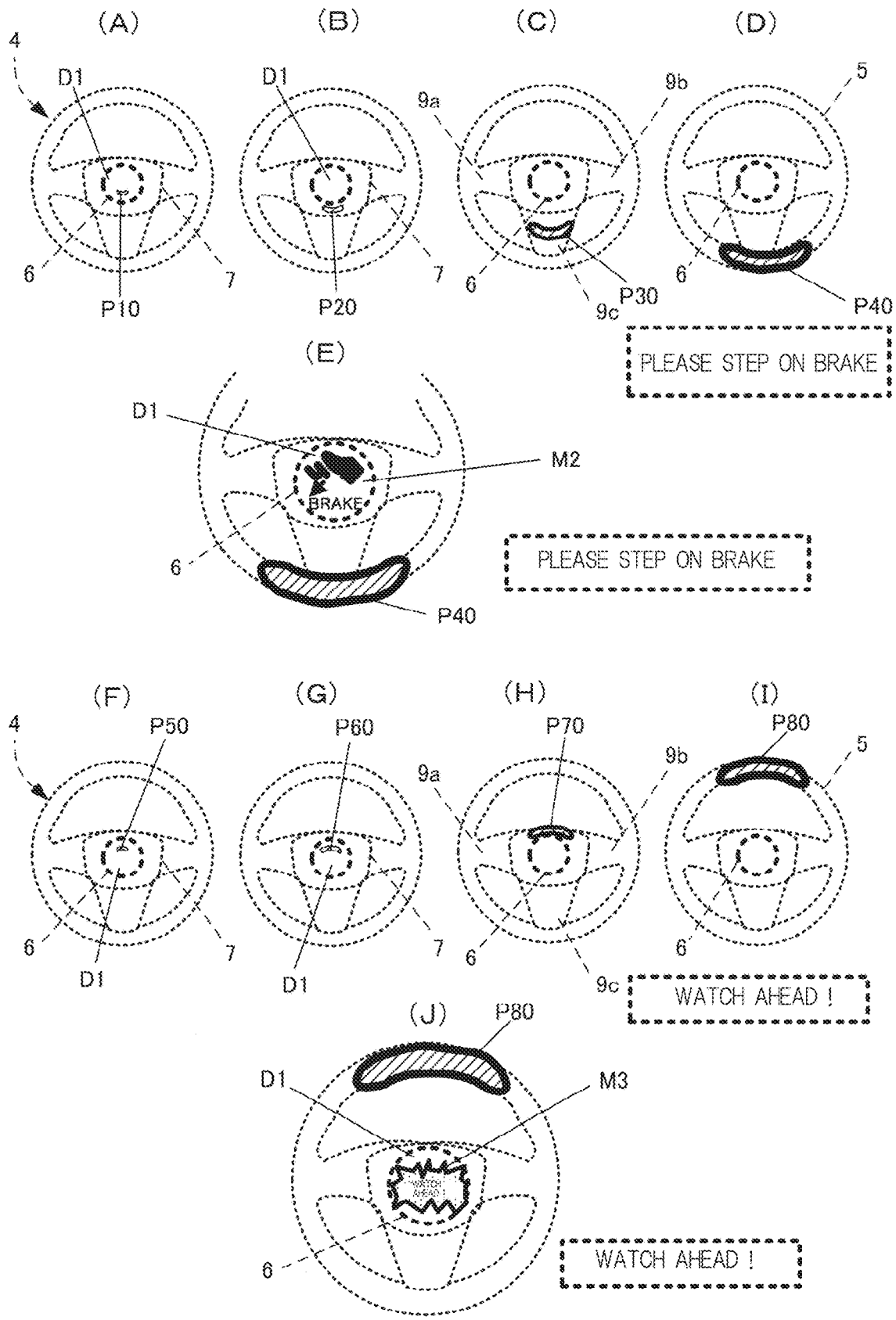
FIGS. 11(A) to (E) are diagrams illustrating an example of a case where the display position and the display movement direction on the steering wheel are changed in accordance with the subsequent action to be taken by the driver.
FIGS. 11(F) to (J) are diagrams illustrating another example.

Reference is now made to FIG. 11. FIGS. 11(A) to (E) are diagrams illustrating an example of a case where the display position and the display movement direction on the steering wheel are changed in accordance with the subsequent action to be taken by the driver, and FIGS. 11(F) to (J) are diagrams illustrating another example.

FIG. 11 illustrates a display example in a case where other useful information (information other than the driving level change information) is displayed in association with the notification of the driving level change.

In FIGS. 11(A) to (D), display pieces P10 to P40 having different sizes are displayed at different times on the central portion 7 of the steering wheel 4, the connecting portion 9*c* extending downward from the central portion 7, and the outer edge 5. In other words, the linear or band-like display pieces P10 to P40 are moved in a direction (here, downward) corresponding to the subsequent action to be taken by the driver 3 (here, the action of stepping on the brake).

Further, in FIG. 11(D), the guide voice "Please step on the brake" is output from the speaker 107.

In this way, by changing the display position of the display piece in accordance with the subsequent action to be taken by the driver, it is possible to cause the driver 3 to recognize in advance what to do and to have mental preparation.

Further, in FIG. 11(E), the linear or band-like display piece P40 is displayed on the lower side of the outer edge of the steering wheel 4, and an icon M2 prompting the driver to step on the brake is displayed in the central display region D1 in the central portion 7 of the steering wheel 4. Thus, the driver 3 may surely and quickly understand the necessity of the operation of stepping on the brake. Also in FIG. 11(E), the guide voice "Please step on the brake" is output from the speaker 107.

In FIGS. 11(F) to (I), display pieces P50 to P80 having different sizes are displayed at different times on the central portion 7 and the outer edge 5 of the steering wheel 4. In other words, the linear or band-like display pieces P50 to P80 are moved in the direction (here, upward) corresponding to the subsequent action to be taken by the driver 3 (here, the action of paying attention to the front). In addition, the guide voice "Watch ahead" is output from the speaker 107.

In FIG. 11(J), an icon M3 prompting the driver to pay attention to the front is further displayed in the central display region D1 in the central portion 7 of the steering wheel 4.

Figure 12:
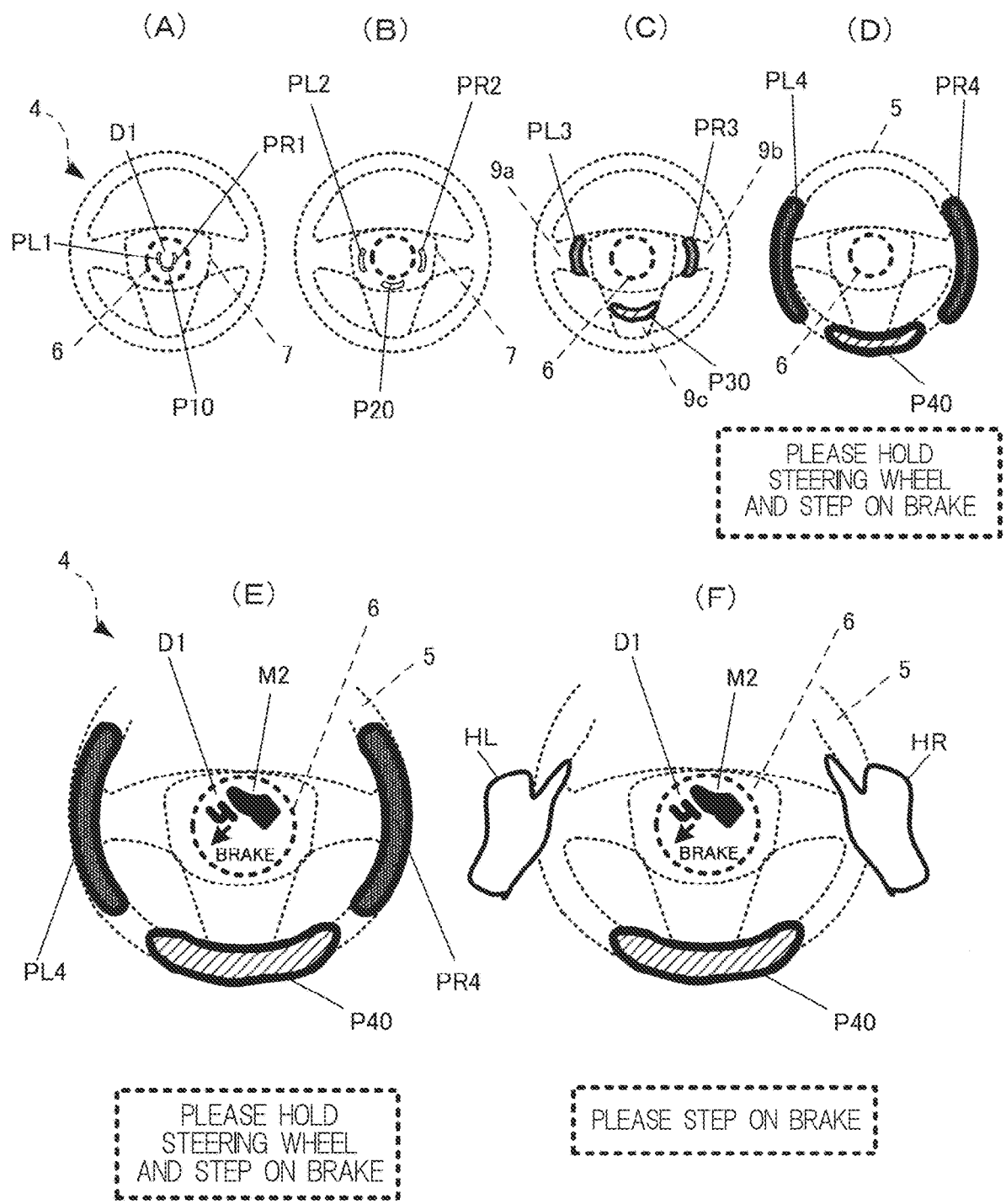
FIGS. 12(A) to (F) are diagrams illustrating an example in which the display indicating the change content of the driving assistance level and the display indicating the subsequent action to be taken by the driver are simultaneously performed.

Reference is now made to FIG. 12. FIGS. 12(A) to (F) are diagrams illustrating an example in which the display indicating the change content of the driving assistance level and the display indicating the subsequent action to be taken by the driver are simultaneously performed.

The example of FIG. 12 is basically the same as the example of FIG. 11. However, in FIG. 12, the display control illustrated above in FIG. 6(A) (the display control to move the pair of display pieces to right and left) and the display control illustrated in FIGS. 11(A) to (E) (the display control to move the display pieces downward) are simultaneously performed. This point is different from FIG. 11.

In FIG. 12(D), the guide voice "Please hold the steering wheel and step on the brake" is output from the speaker 107.

Also in FIG. 12(E), the guide voice "Please hold the steering wheel and step on the brake" is output from the speaker 107.

Here, when the driver 3 holds the steering wheel but does not step on the brake, as illustrated in FIG. 12(F), the display piece P40 prompting the driver 3 to step on the brake is continuously displayed. Further, the guide voice "Please step on the brake" is repeatedly output from the speaker 107.

In the example of FIG. 12, a plurality of pieces of information may be notified to the driver 3 at a time.

Figure 13:
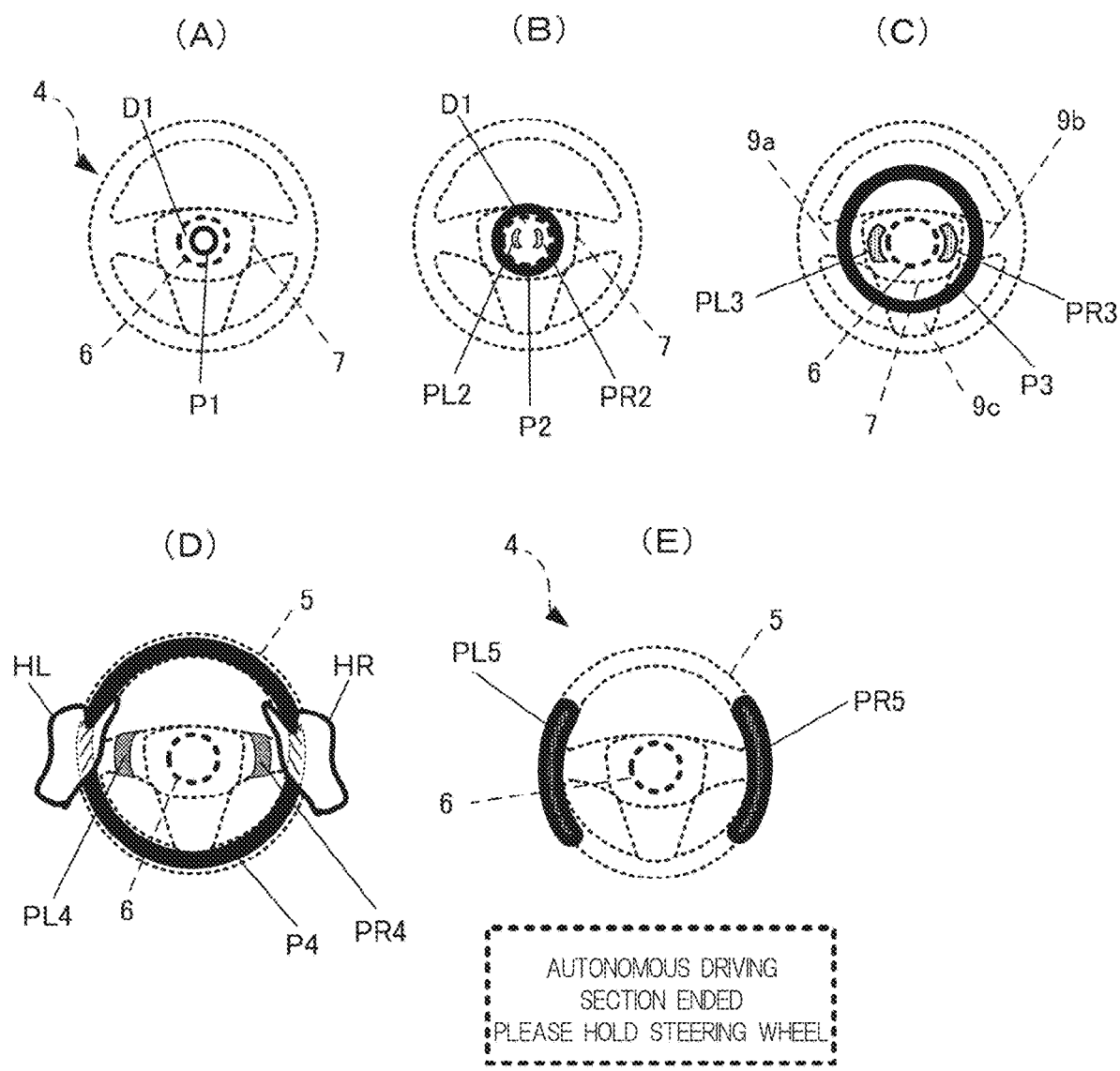
FIGS. 13(A) to (E) are diagrams illustrating a display example (modification) in which the display by the annular pattern and a pair of separated linear or band-like patterns are used in combination.

Reference is now made to FIG. 13. FIGS. 13(A) to (E) are diagrams illustrating a display example (modification) in which the display by the annular pattern and a pair of separated linear or band-like patterns are used in combination.

In FIG. 13, the display illustrated above in FIGS. 3(A) to (D) and the display illustrated in FIG. 6(A) are used in combination so that the driver has the sense of wave-like movement of the pattern more clearly.

In FIGS. 13(A) to (D), the annular patterns P1, P2, P3, and P4 are displayed at different times.

Here, in FIG. 13(C), the pair of linear or band-like display pieces (patterns) PL3 and PR3 are displayed in the central portion (hub) 7 of the steering wheel 4. Subsequently, in FIG. 13(D), the pair of linear or band-like display pieces (patterns) PLA and PR4 are displayed in the left and right connecting portions (spokes) 9*a* and 9*b* of the steering wheel 4.

Subsequently, in FIG. 13(E), the pair of linear or band-like display pieces (patterns) PL5 and PR5 are displayed at the left and right positions of the outer edge (rim) 5 of the steering wheel 4. In FIG. 13(E), the guide voice "Autonomous driving section ended. Please hold the steering wheel" is output from the speaker 107.

Figure 14:
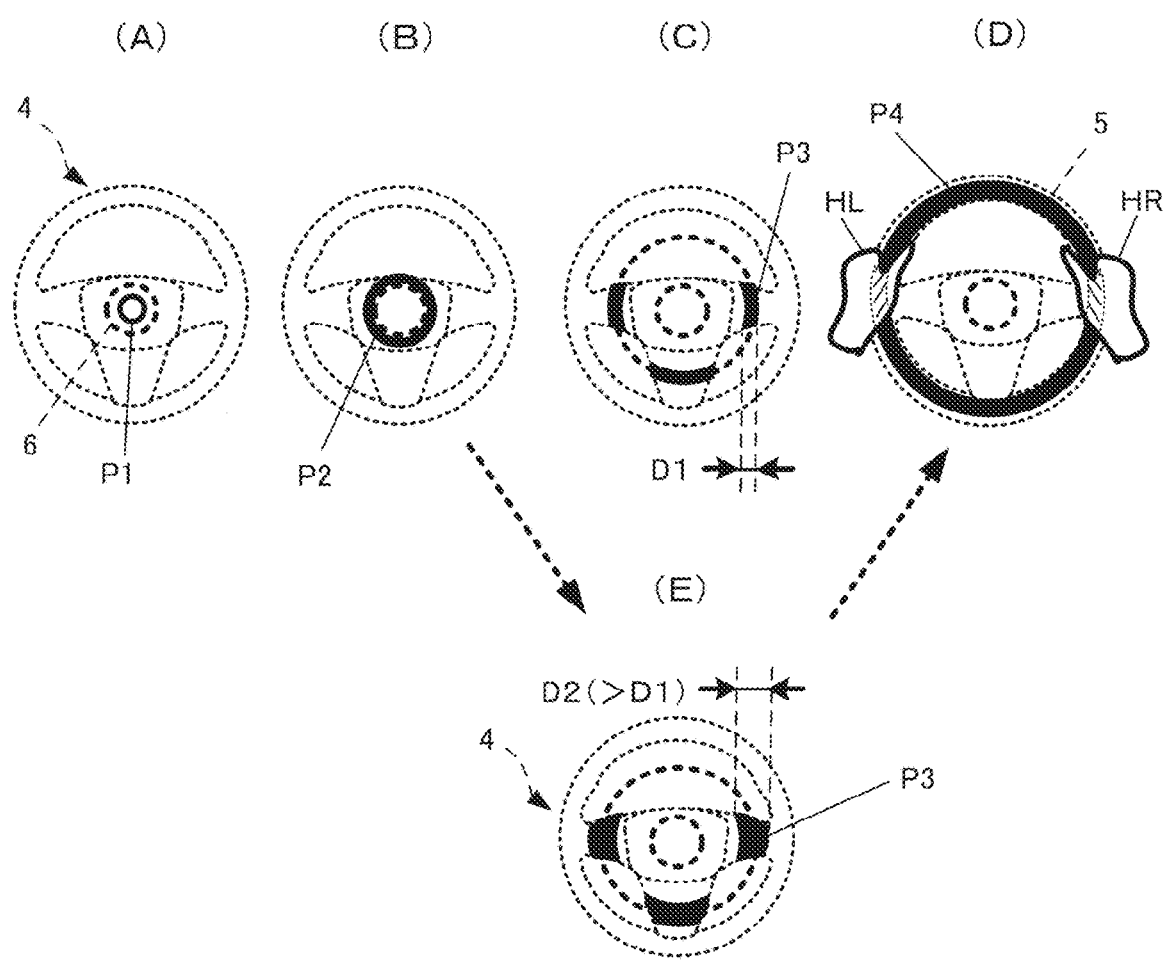
FIGS. 14(A) to (E) are diagrams illustrating an example (application example) in which the width of the band-like pattern in the connecting portion is set to be larger (wider) than the width of the annular pattern in the central portion or the outer edge when the annular pattern is moved from the inner side to the outer side of the steering wheel.

Reference is now made to FIG. 14. FIGS. 14(A) to (E) are diagrams illustrating an example (application example) in which the width of the band-like pattern in the connecting portion is set to be larger (wider) than the width of the annular pattern in the central portion or the outer edge when the annular pattern is moved from the inner side to the outer side of the steering wheel.

In FIGS. 14(A) and (B), the first circular or annular patterns P1 and P2 are sequentially displayed in the central portion 7 of the steering wheel, in FIG. 14(C), the part (linear or band-like display piece) P3 of the second circular or annular pattern concentric with the first circular or annular pattern is displayed in the connecting portions 9*a*, 9*b* and 9*c*, and in FIG. 14(D), the third circular or annular pattern P4 concentric with the first and second circular or annular patterns is displayed in the outer edge 5.

In FIG. 14(C), it is undeniable that a sense of discomfort is likely to occur because the entire circle or annular ring cannot be displayed in the connecting portions 9*a* and 9*b* of the steering wheel 4. Therefore, as illustrated in FIG. 14(E), display control is performed to suppress the sense of discomfort.

In FIG. 14(E), a line width or band width D2 of the second circle or annular ring is set larger than a line width or band width D1 of the first and third circles or annular rings.

As illustrated in FIGS. 14(A) to (D), in a case where the display element is moved from the inner side to the outer side (or may be moved from the outer side to the inner side), when it takes time for the display element to pass through the connecting portions 9a and 9b, a period in which a sense of discomfort occurs becomes long.

Therefore, in FIG. 14(E), in order to shorten the passage time of the band of light in the connecting portions 9a and 9b, the band width of the band of light is made larger (wider) than the band width in the annular ring of the central portion 7 and the outer edge 5, and the band of light is quickly moved so as to pass the connecting portions 9a and 9b in a short time. As a result, a sense of discomfort may be reduced.

Figure 15:
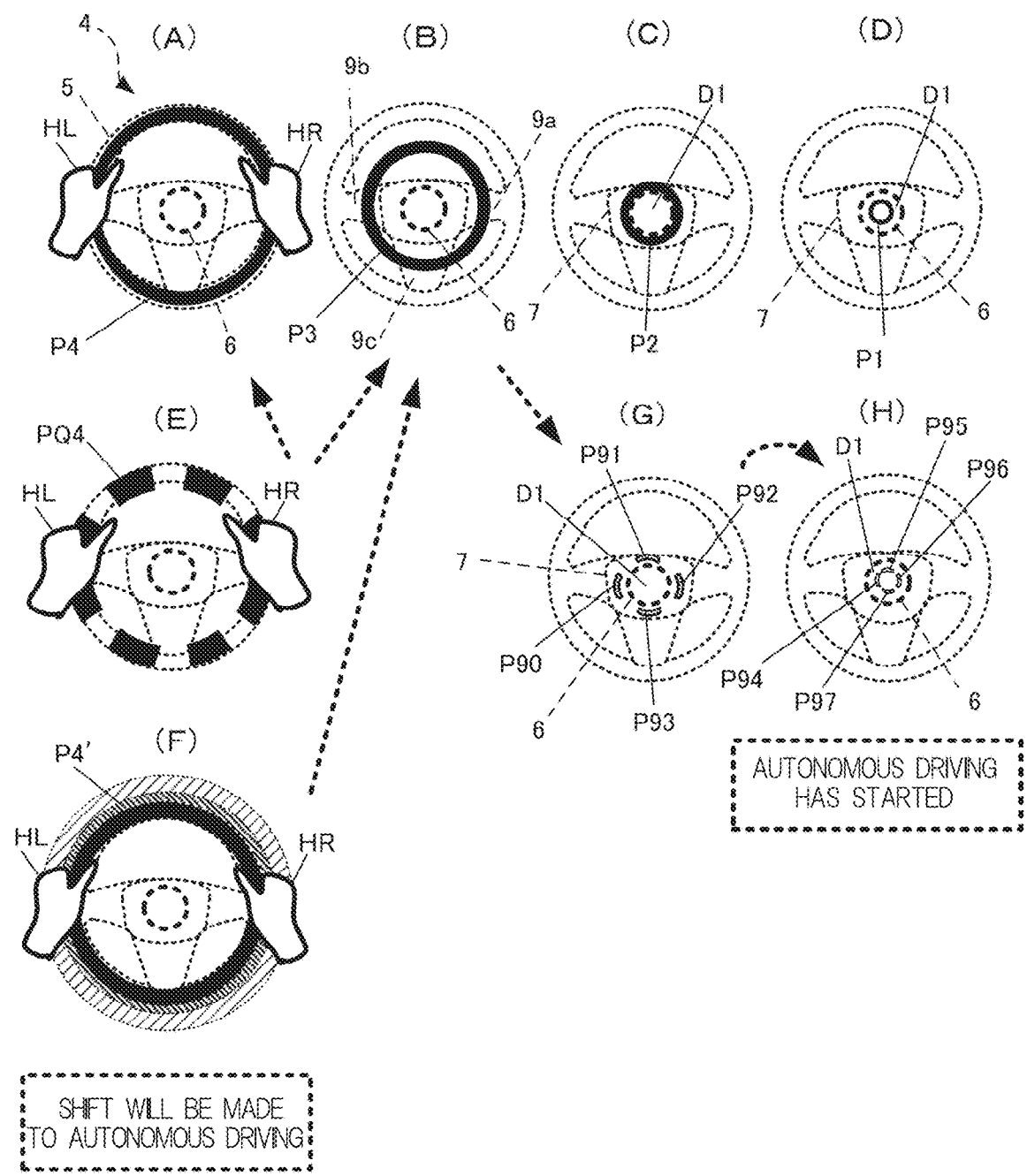
FIGS. 15(A) to (H) are diagrams illustrating a display example (including an advance notification process) when the driving assistance is expanded.

Reference is now made to FIG. 15. FIGS. 15(A) to (H) are diagrams illustrating a display example (including an advance notification process) when the driving assistance is expanded.

FIGS. 15(A) to (D) are the same as FIGS. 3(F) to (I) described above. By moving the annular pattern from the outer side to the inner side on the steering wheel 4, it is possible to cause the driver 3 to have a sense (second sense) of a motion (movement) from the near side to the far side.

In FIGS. 15(E) and (F), in order to notify the driver 3 of the expansion of the driving assistance, before causing the driver to have the above-described second sense (before the display of FIG. 15(A)), the display process for increasing the noticeability is performed in the outer edge 5 of the steering wheel 4. The reference characters HL and HR denote the left hand and the right hand of the driver 3 holding the steering wheel.

In FIG. 15(E), an intermittent light band PQ4 is displayed. In FIG. 15(F), the emphasis process illustrated in FIG. 8(E) is performed first.

Further, in FIG. 15(E), FIG. 15(F), or FIG. 15(A), the guide voice "Shift will be made to autonomous driving" is output from the speaker 107. After FIG. 15(E) or (F), the process proceeds to FIG. 15(A) or FIG. 15(B).

In this way, in a case where the driver 3 is notified of the expansion of the driving assistance level, the display for increasing the noticeability is displayed on the steering wheel 4 in advance so that, for example, it is possible to cause the driver 3 to instantaneously understand that the display indicating that the driving level has been changed is started. Therefore, the user may have mental preparation in advance. Therefore, for example, it is possible to obtain an effect of reducing a sense of discomfort due to the sudden start of light rendering.

Further, subsequent to FIG. 15(B), the rendering of display illustrated in FIGS. 15(G) and (H) may be performed. In FIG. 15(G), band-like (arc-shaped) display pieces P90 to P93 are displayed in the central portion 7 of the steering wheel 4.

In FIG. 15(H), band-like (arc-shaped) display pieces P94 to P97 are displayed in the central display region D1 in the central portion 7 of the steering wheel 4. By appropriately performing various display controls, it is possible to reliably notify the driver of a change in the driving assistance level.

In FIG. 15(D) or 15(H), the guide voice "Autonomous driving has started" is output from the speaker 107.

Figure 16:
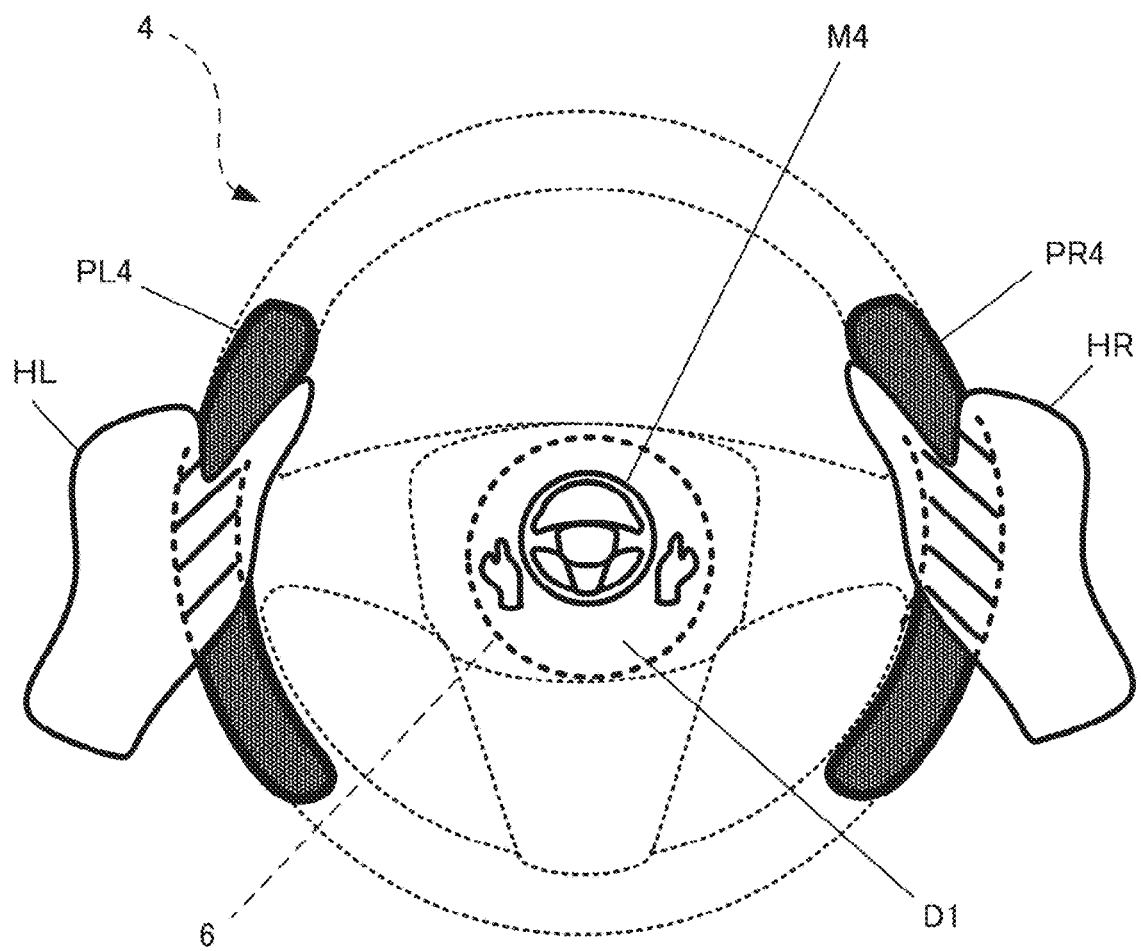
FIG. 16 is a diagram illustrating another example in which an icon indicating a driving state (driving mode) is displayed in the central portion of the steering wheel.

Reference is now made to FIG. 16. FIG. 16 is a diagram illustrating another example in which an icon indicating a driving state (driving mode) is displayed in the central portion of the steering wheel.

FIG. 16 corresponds to FIG. 9 described above. In FIG. 16, in the central display region D1 in the central portion 7 of the steering wheel 4, an icon M4 prompting the driver 3 to release his/her hand from the steering wheel is displayed. In addition, the guide voice "Autonomous driving has started. Please release your hand from the steering wheel" is output from the speaker 107.

By these controls, the driver may surely and quickly understand what to do next.

Reference is now made to FIG. 17. FIG. 17(A) is a diagram illustrating a display example (including a mark (light mark) displayed in the central portion of the steering wheel) in the autonomous driving state, and FIGS. 17(B) and (C) are diagrams illustrating other examples of the mark (light mark) displayed in the central portion of the steering wheel.

FIG. 17 illustrates a display example during autonomous driving. In FIG. 17(A), control is performed to move band-like display elements (arc-shaped display pieces) P100 and P102 in accordance with the automatic rotation of the steering wheel 4 by autonomous driving control. As a result, the driver may visually confirm that the autonomous driving is being performed smoothly and may feel safe.

Further, in FIG. 17(A), a figure (or pattern) having a decorative effect is displayed by combining a plurality of circles in the central display region D1 of the steering wheel 4. A motion may be given to the figure (or pattern) by changing and moving the position of each circle which is a component of the figure (or pattern). When such a figure or the like is displayed in the central display region D1, the sense of security of the driver during autonomous driving is increased, and a comfortable driving environment may be provided.

In addition, as illustrated in FIG. 17(B), a mark M6 indicating the manufacturer of the vehicle display device or the like may be displayed in the central display region D1, and as illustrated in FIG. 17(C), the characters indicating the approach of an ambulance may be displayed. In FIG. 17(C), the guide voice "Ambulance is approaching" is output from the speaker 107. By such display control, it is possible to notify the driver of various types of information without a sense of discomfort during autonomous driving.

Figure 18:
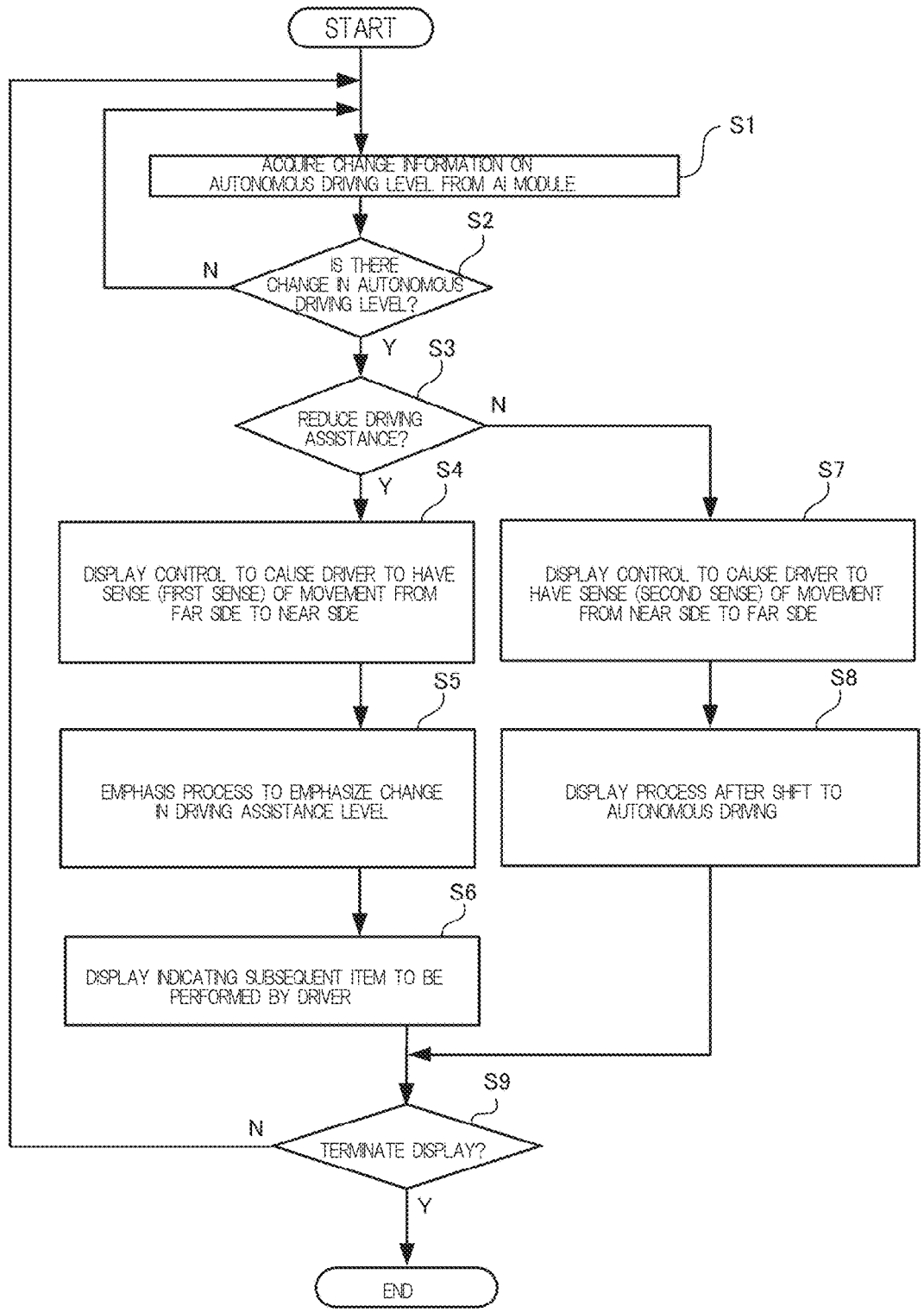
FIG. 18 is a flowchart illustrating a procedure example of display control.

Reference is now made to FIG. 18. FIG. 18 is a flowchart illustrating a procedure example of the display control.

In Step S1, the change information on the autonomous driving level (the prediction information of a change in the driving level) is acquired from the AI module of the autonomous driving system.

In Step S2, it is determined whether there is a change in the autonomous driving level. In the case of Y, the process proceeds to Step S3, and it is determined whether the driving assistance level is reduced (whether the driving level is lowered). In Step S3, in the case of Y, the process proceeds to Step S4, and in the case of N, the process proceeds to Step S7.

In Step S4, the display control is performed to cause the driver to have the sense (the first sense) of movement from the far side to the near side.

Subsequently, in Step S5, an emphasis process is performed to emphasize a change in the driving assistance level. In Step S6, the display indicating the subsequent item to be performed by the driver is performed.

In Step S7, the display control is performed to cause the driver to have the sense (the second sense) of movement from the near side to the far side. Subsequently, in Step S8, the display process after the shift to autonomous driving is performed.

In Step S9, it is determined whether the display is to be terminated. In the case of Y, the display is terminated, and in the case of N, the process returns to Step S1.

By such display control, for example, when the driving assistance level is changed, the driver may intuitively recognize the change content without a sense of discomfort by performing the rendering by the display element.

The driver does not follow the movement of the display element with the eyes and confirm and understand the moving direction as in the related art, but intuitively understands the change content, and therefore instantaneous understanding is achieved. Therefore, it is possible to shorten the time required for the driver to understand that the driving mode has been changed. This also contributes to safe driving and the like.

When the above-described method is implemented by using a computer program, the above-described display control method may be implemented simply and easily by a computer system having a basic configuration including a processor, a memory, and the like.

Although the embodiment of the present invention has been described above, the present invention is not limited to the embodiment, and various modifications and applications are possible. For example, the region on the steering wheel to be gripped by the driver is indicated by the light mark, but when the driver does not grip the steering wheel, the light mark may be blinked, or the light mark may be changed to a color indicating a warning and blinked. Such changes may be made as appropriate.

In addition, the display element, the display piece, and the like may also be referred to as "display by light (light display)" or "light mark" in a broad sense. In addition, the display control (rendering of display) for displaying the display element on the steering wheel using a projector or a light emitting element may also be referred to as "light marking".

Further, in the present specification, the term "vehicle" may also be interpreted as a transportation machine in a broad sense. It is assumed that the terms regarding driving assistance are understood in a broad sense in consideration of the viewpoint of information in a broad sense useful for traveling of the vehicle, for example.

Further, the display device and the vehicle display device include those used as a simulator (for example, a simulator of an aircraft, a simulator as a game device, or the like).

The present invention is not limited to the exemplary embodiment described above, and a person skilled in the art may easily modify the exemplary embodiment described above to the extent that the exemplary embodiment is included in the scope of the claims.

DESCRIPTION OF REFERENCE NUMERALS

4 STEERING WHEEL (WHEEL)
5 OUTER EDGE (RIM) OF STEERING WHEEL
6 CONCAVE PORTION REGION PROVIDED IN CENTRAL PORTION OF STEERING WHEEL
7 CENTRAL PORTION (HUB OR BOSS) OF STEERING WHEEL
9a to 9c CONNECTING PORTION (SPOKE) OF STEERING WHEEL
10 DRIVING ASSISTANCE SYSTEM (AUTONOMOUS DRIVING SYSTEM)
12 INFORMATION COLLECTION UNIT
14 AI MODULE
16 SPEED CONTROL MODULE
18 STEERING CONTROL MODULE
100 DISPLAY DEVICE (VEHICLE DISPLAY DEVICE, IN-CAR DISPLAY DEVICE, OR IN-CAR PROJECTOR)
102 DISPLAY CONTROL DEVICE (PROCESSOR)
104 CONTROL UNIT
105 VOICE GUIDE UNIT
107 SPEAKER
108 OPERATION DETECTION UNIT
110 DISPLAY APPARATUS CONTROL UNIT
112 PROJECTOR (PROJECTING UNIT, PROJECTION LIGHT SOURCE UNIT), OPERATION DETECTION CAMERA (OCCUPANT IMAGING CAMERA)
116 LIGHT EMITTING ELEMENT (OR ILLUMINATION ELEMENT) SUCH AS LED
120 INSTRUMENT PANEL
122, 123 DISPLAY APPARATUS (DISPLAY UNIT) SUCH AS LIQUID CRYSTAL DISPLAY DEVICE
P1 to P4 DISPLAY ELEMENT (PATTERN, LIGHT DISPLAY, LIGHT PATTERN, OR LIGHT MARK) FORMED ON STEERING WHEEL
PL1 to PL4, PR1 to PR4 DISPLAY PIECE (STRIP LIGHT, LINEAR OR BAND-LIKE LIGHT PATTERN SUCH AS ARC SHAPE, OR LIGHT MARK)
D1 CENTRAL DISPLAY REGION IN CENTRAL PORTION OF STEERING WHEEL
M1 to M7 MARK SUCH AS CHARACTER, FIGURE, OR SYMBOL (INCLUDING ICON, PATTERN, AND THE LIKE) DISPLAYED IN CENTRAL DISPLAY REGION

The invention claimed is:

1. A display control device that controls an illumination unit capable of forming a display with light on a steering wheel including a central portion, an outer edge, and a connecting portion that connects the central portion and the outer edge in a vehicle having a driving assistance function, the display control device comprising:
a control unit that controls rendering by a first display element formed in the central portion of the steering wheel, a second display element formed in the connecting portion, and a third display element formed in the outer edge,
wherein when a driving assistance level is changed, by rendering by the first display element, the second display element, and the third display element on the steering wheel, the control unit presents change information on the driving assistance level by causing a driver of the vehicle to have at least one of:
a first sense in which a driving responsibility of the vehicle moves toward the steering wheel from a front portion in front of the steering wheel of the vehicle; and
a second sense in which the driving responsibility of the vehicle moves from the steering wheel toward the front portion of the vehicle, and
wherein the control unit:
causes the driver to have the first sense when driving assistance is reduced; and
causes the driver to have the second sense when driving assistance is expanded.

2. The display control device according to claim 1, wherein, when performing rendering by the first display element, the second display element, and the third display element of the steering wheel, the control unit expresses each of the first display element, the second display element, and the third display element in perspective so that one image perceived by the driver becomes a stereoscopic image having a sense of depth based on each of the first display element, the second display element, and the third display element, and displays the first display element, the second display element, and the third display element at different times or causes changes in display states of the first display element, the second display element, and the third display element at different times so that the driver feels a motion.

3. A display control device that controls an illumination unit capable of forming a display with light on a steering wheel including a central portion, an outer edge, and a connecting portion that connects the central portion and the outer edge in a vehicle having a driving assistance function, the display control device comprising:

a control unit that controls rendering by a first display element formed in the central portion of the steering wheel, a second display element formed in the connecting portion, and a third display element formed in the outer edge, wherein when a driving assistance level is changed, by rendering by the first display element, the second display element, and the third display element on the steering wheel, the control unit presents change information on the driving assistance level by causing a driver of the vehicle to have at least one of:

a first sense in which a driving responsibility of the vehicle moves toward the steering wheel from a front portion in front of the steering wheel of the vehicle; and a second sense in which the driving responsibility of the vehicle moves from the steering wheel toward the front portion of the vehicle, and wherein, when performing rendering by the first display element, the second display element, and the third display element of the steering wheel, the control unit;

expresses each of the first display element, the second display element, and the third display element in perspective so that one image perceived by the driver becomes a stereoscopic image having a sense of depth based on each of the first display element, the second display element, and the third display element;

when causing the driver to have the first sense,
displays the first display element, the second display element, and the third display element in this order at different times to make the driver feel a motion from a far side to a near side when viewed from the driver, or displays the first display element, the second display element, and the third display element at the same time and changes display states of the first display element, the second display element, and the third display element in this order at different times to make the driver feel a motion from the far side to the near side when viewed from the driver; and when causing the driver to have the second sense,
displays the third display element, the second display element, and the first display element in this order at different times to make the driver feel a motion from the near side to the far side when viewed from the driver, or displays the first display element, the second display element, and the third display element at the same time and changes display states of the third display element, the second display element, and the first display element in this order at different times to make the driver feel a motion from the near side to the far side when viewed from the driver.

4. The display control device according to claim 3, wherein when expressing each of the first display element, the second display element, and the third display element in perspective, the control unit increases sizes of the first display element, the second display element, and the third display element in this order to generate a sense of perspective by linear perspective, or increases sizes of the first display element, the second display element, and the third display element in this order to generate a first sense of perspective by linear perspective and expresses each of the first display element, the second display element, and the third display element by aerial perspective to generate a second sense of perspective whose directionality matches directionality of the first sense of perspective.

5. The display control device according to claim 1, wherein each of the first display element and the third display element has a circular or annular shape, and the second display element is a linear or band-like display piece formed in a part of the connecting portion, or each of the first display element, the second display element, and the third display element includes a pair of separated linear or band-like display pieces, or each of the first display element, the second display element, and the third display element includes a pair of separated linear or band-like display pieces, and each of the display pieces is arranged on a virtual concentric circle centered on one point set in the central portion of the steering wheel and on a virtual straight line passing through the one point and intersecting with each concentric circle.

6. The display control device according to claim 3, wherein when causing the driver to have the first sense, the control unit performs an emphasis process to emphasize the third display element at a display timing of the third display element or after the third display element is displayed, or performs an emphasis process to emphasize the third display element at a timing of a change in the display state of the third display element or after the display state of the third display element is changed.

7. The display control device according to claim 6, wherein in the emphasis process, the control unit temporarily increases luminance or brightness of the third display element or temporarily changes color, hue, or saturation of the third display element, or when the third display elements are a pair of separated linear or band-like display pieces, temporarily extends a length of the display pieces, or when the third display elements are a pair of separated linear or band-like display pieces, swings the display pieces along the outer edge of the steering wheel.

8. The display control device according to claim 1, wherein the control unit on the outer edge of the steering wheel, displays a linear or band-like display piece indicating a region to be gripped by the driver with each of a left hand and a right hand, or on the outer edge of the steering wheel, displays a linear or band-like display piece at a position corresponding to a subsequent action to be taken by the driver, or moves a linear or band-like display piece in a direction corresponding to the subsequent action to be taken by the driver either at the central portion or at the central portion and the connecting portion of the steering wheel, or moves a linear or band-like display piece in accordance with automatic rotation of the steering wheel by autonomous driving.

9. The display control device according to claim 1, wherein the control unit displays a light mark including at least one of a character, a figure, and a symbol indicating a driving state, a driving situation, or information regarding a subsequent operation to be performed by the driver on the central portion of the steering wheel, or displays a light mark including at least one of a character, a figure, and a symbol indicating a driving state, a driving situation, or information regarding a subsequent operation to be performed by the driver on the central portion of the steering wheel and notifies the information by voice.

10. The display control device according to claim 1, wherein before causing the driver to have the second sense, the control unit performs a display process to increase noticeability on the outer edge of the steering wheel.

11. The display control device according to claim 1, wherein the control unit displays a first circle or annular ring in the central portion of the steering wheel, displays a part of a second circle or annular ring concentric with the first circle or annular ring in the connecting portion, and when displaying a third circle or annular ring concentric with the first circle or annular ring and the second circle or annular ring in the outer edge, sets a line width or a band width of the second circle or annular ring to be larger than a line width or a band width of the first circle or annular ring and the third circle or annular ring.

12. A display device comprising:

the display control device according to claim 3 provided in the vehicle; and an illumination unit that is provided in the vehicle and whose light emission is controlled by the display control device.

13. The display device according to claim 12, wherein the illumination unit includes a projector that projects light onto the steering wheel of the vehicle to illuminate the steering wheel, or includes a projector that projects light onto the steering wheel of the vehicle to illuminate the steering wheel and a light emitting element provided on the steering wheel, or includes a light emitting element provided on the steering wheel.

14. A display control method for forming a display with light on a steering wheel including a central portion, an outer edge, and a connecting portion that connects the central portion and the outer edge in a vehicle having a driving assistance function, the display control method comprising:

when a driving assistance level is changed,
by controlling rendering by a first display element formed in the central portion of the steering wheel, a second display element formed in the connecting portion, and a third display element formed in the outer edge, and presenting change information on the driving assistance level by causing a driver of the vehicle to have at least one of:

a first sense in which a driving responsibility of the vehicle moves toward the steering wheel from a front portion in front of the steering wheel of the vehicle; and a second sense in which the driving responsibility of the vehicle moves from the steering wheel toward the front portion of the vehicle, wherein display control method further comprises:

when performing rendering by the first display element, the second display element, and the third display element of the steering wheel, expressing each of the first display element, the second display element, and the third display element in perspective so that one image perceived by the driver becomes a stereoscopic image having a sense of depth based on each of the first display element, the second display element, and the third display element, and when causing the driver to have the first sense, displaying the first display element, the second display element, and the third display element in this order at different times to make the driver feel a motion from a far side to a near side when viewed from the driver, or displaying the first display element, the second display element, and the third display element at the same time and changes display states of the first display element, the second display element, and the third display element in this order at different times to make the driver feel a motion from the far side to the near side when viewed from the driver, and when causing the driver to have the second sense, displaying the third display element, the second display element, and the first display element in this order at different times to make the driver feel a motion from the near side to the far side when viewed from the driver, or displaying the first display element, the second display element, and the third display element at the same time and changes display states of the third display element, the second display element, and the first display element in this order at different times to make the driver feel a motion from the near side to the far side when viewed from the driver.

15. The display control device according to claim 3, wherein each of the first display element and the third display element has a circular or annular shape, and the second display element is a linear or band-like display piece formed in a part of the connecting portion, or each of the first display element, the second display element, and the third display element includes a pair of separated linear or band-like display pieces, or each of the first display element, the second display element, and the third display element includes a pair of separated linear or band-like display pieces, and each of the display pieces is arranged on a virtual concentric circle centered on one point set in the central portion of the steering wheel and on a virtual straight line passing through the one point and intersecting with each concentric circle.

16. The display control device according to claim 3, wherein the control unit
on the outer edge of the steering wheel, displays a linear or band-like display piece indicating a region to be gripped by the driver with each of a left hand and a right hand, or
on the outer edge of the steering wheel, displays a linear or band-like display piece at a position corresponding to a subsequent action to be taken by the driver, or
moves a linear or band-like display piece in a direction corresponding to the subsequent action to be taken by the driver either at the central portion or at the central portion and the connecting portion of the steering wheel, or
moves a linear or band-like display piece in accordance with automatic rotation of the steering wheel by autonomous driving.

17. The display control device according to claim 3, wherein the control unit
displays a light mark including at least one of a character, a figure, and a symbol indicating a driving state, a driving situation, or information regarding a subsequent operation to be performed by the driver on the central portion of the steering wheel, or
displays a light mark including at least one of a character, a figure, and a symbol indicating a driving state, a driving situation, or information regarding a subsequent operation to be performed by the driver on the central portion of the steering wheel and notifies the information by voice.

18. The display control device according to claim 3, wherein the control unit
displays a first circle or annular ring in the central portion of the steering wheel,
displays a part of a second circle or annular ring concentric with the first circle or annular ring in the connecting portion, and
when displaying a third circle or annular ring concentric with the first circle or annular ring and the second circle or annular ring in the outer edge, sets a line width or a band width of the second circle or annular ring to be larger than a line width or a band width of the first circle or annular ring and the third circle or annular ring.

19. The display control device,
wherein when the steering wheel viewed from the driver is one virtual plane having a two-dimensional spread in a real space, a virtual first responsible area is set on a side of the front portion of the vehicle and a virtual second responsible area is set on a side of the driver with the plane as a boundary, and
wherein the control unit:
causes the driver to have the first sense and thus recognize a shift from the first responsible area to the second responsible area; and
causes the driver to have the second sense and thus recognize a shift from the second responsible area to the first responsible area.

20. A display device comprising:
the display control device according to claim 1 provided in the vehicle; and
an illumination unit that is provided in the vehicle and whose light emission is controlled by the display control device.

* * * * *